(12) United States Patent
Sherman et al.

(10) Patent No.: US 8,954,296 B2
(45) Date of Patent: Feb. 10, 2015

(54) MODEL BUILDING FOR PRESSURE DIAGNOSTICS SIMULATION

(75) Inventors: Kim Sherman, Spencerport, NY (US);
Dale Sherman, Manlius, NY (US);
Micah Harrison, Spencerport, NY (US);
Matthew Wellman, Rochester, NY (US)

(73) Assignee: EnergyWright, Inc., Manlius, NY (US)

( * ) Notice: Subject to any disclaimer, the term of this patent is extended or adjusted under 35 U.S.C. 154(b) by 663 days.

(21) Appl. No.: 13/222,861

(22) Filed: Aug. 31, 2011

(65) Prior Publication Data

US 2012/0053906 A1 Mar. 1, 2012

Related U.S. Application Data

(60) Provisional application No. 61/378,535, filed on Aug. 31, 2010.

(51) Int. Cl.
*G06F 17/50* (2006.01)
*G09B 23/12* (2006.01)

(52) U.S. Cl.
CPC ..................................... *G09B 23/12* (2013.01)
USPC .................................................. 703/1; 703/6

(58) Field of Classification Search
None
See application file for complete search history.

(56) References Cited

U.S. PATENT DOCUMENTS

| | | | |
|---|---|---|---|
| 2,000,618 A | 5/1935 | Schultz | |
| 3,363,360 A | 1/1968 | Ryan | |
| 3,719,001 A | 3/1973 | Archer | |
| 3,751,848 A | 8/1973 | Ahlstrand | |
| 3,996,693 A | 12/1976 | Walmer | |
| 4,021,960 A | 5/1977 | Walmer | |
| 4,070,789 A | 1/1978 | Levenson | |
| D255,257 S | 6/1980 | Smith et al. | |
| 4,306,371 A | 12/1981 | Walmer et al. | |
| 4,662,519 A | 5/1987 | Ciociola | |
| 5,482,490 A | 1/1996 | Weldon-Ming | |
| 5,647,181 A | 7/1997 | Hunts | |
| 6,520,831 B1 | 2/2003 | Craig | |
| 7,241,198 B1 | 7/2007 | Boone | |
| 7,415,401 B2 * | 8/2008 | Calvert et al. | 703/10 |
| 2012/0221306 A1 * | 8/2012 | Hurley et al. | 703/6 |

OTHER PUBLICATIONS

"The House of Pressure", Anthony Cox, New River Center for Energy Research and Training, 19 pages, 2003.
"EMC: Pressure Houses", http://www.emcmt.com/services/pressurehouses.html, at least as early as 2010.
"House of Pressure: A Model of Energy Efficiency", Home Energy Magazine online, Mar./Apr. 2010, http://www.homeenergy.org/article_full.php?id=699.

(Continued)

*Primary Examiner* — Andre Allen
(74) *Attorney, Agent, or Firm* — Brown & Michaels, PC

(57) ABSTRACT

A scale model pressure building for teaching pressure diagnostics and weatherization strategies for residential and commercial building structures. The model building is designed for ease of fabrication and ease of assembly. The design allows the instructor to simulate numerous construction errors, airflow problems, air sealing strategies, and testing procedures while in a classroom setting.

47 Claims, 25 Drawing Sheets

(56) References Cited

OTHER PUBLICATIONS

"Opening the Door to Home Performance: Successful Rating and Building Performance Education and Marketing Techniques What's going on in New England?", Conservation Services Group, 70 pages, Mad Air house on p. 68, 2003.

NYSWDA Pressure Diagnostics Training House, http://www.nyswda.org/images/WxTC.html and http://www.nyswda.org/images/pressure_house.html, at least as early as 2009.

"Training Made Easy with the Telltale House Exhibit", Home Energy Magazine Online, Jul./Aug. 1999.

\* cited by examiner

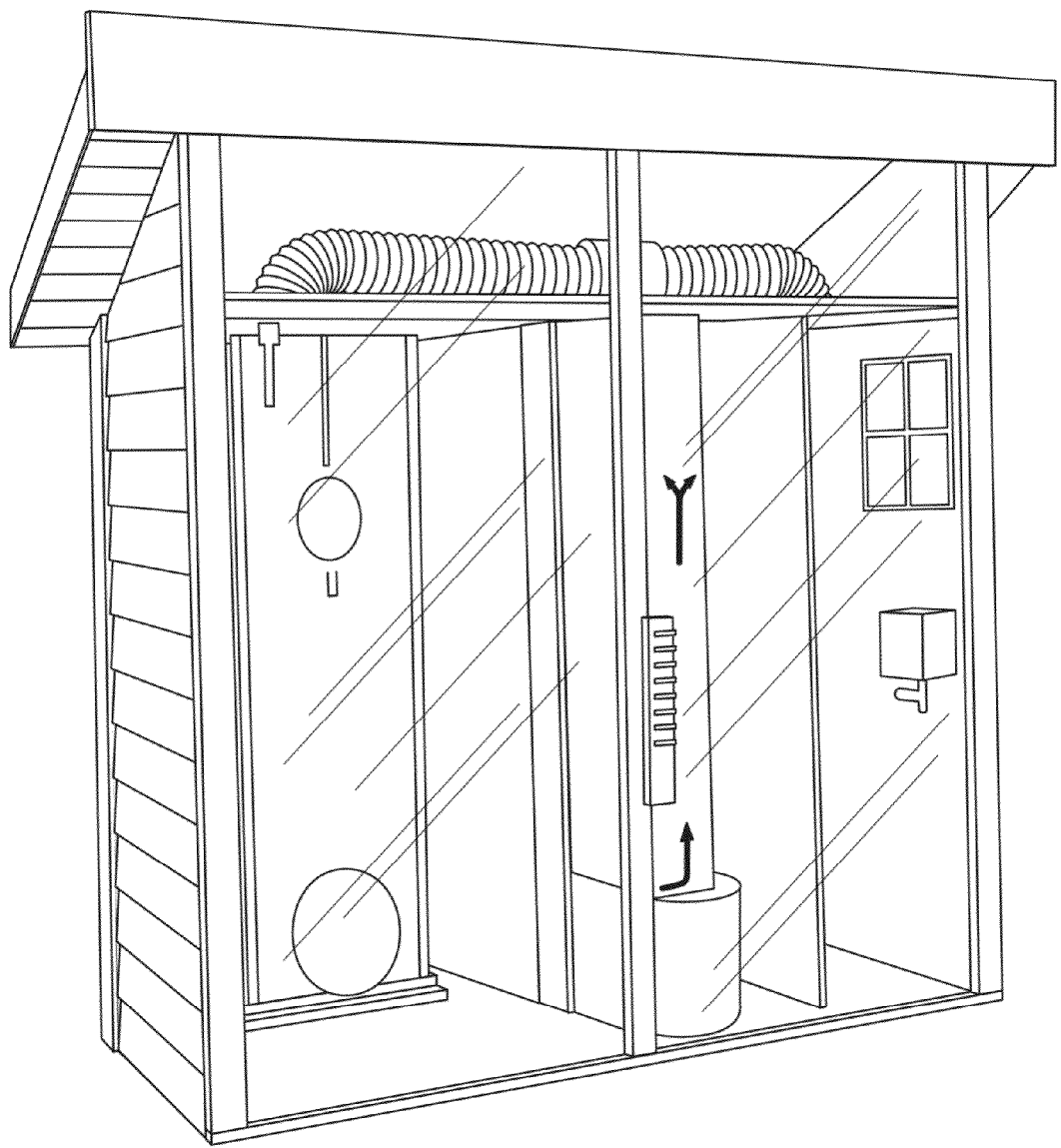
Figure 1- PRIOR ART

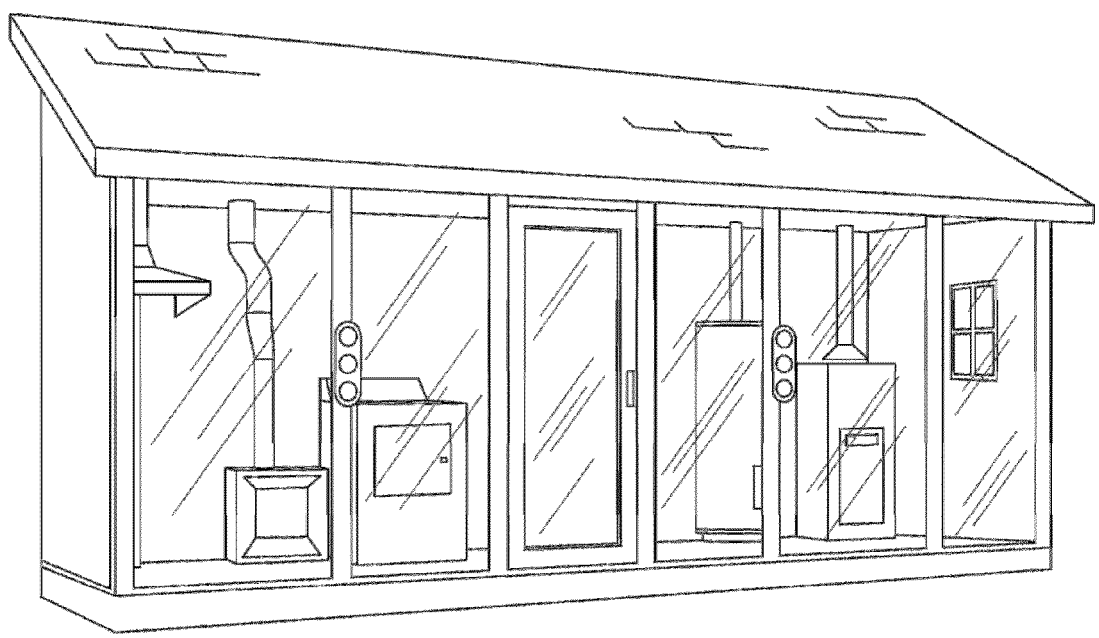
Figure 2 - PRIOR ART

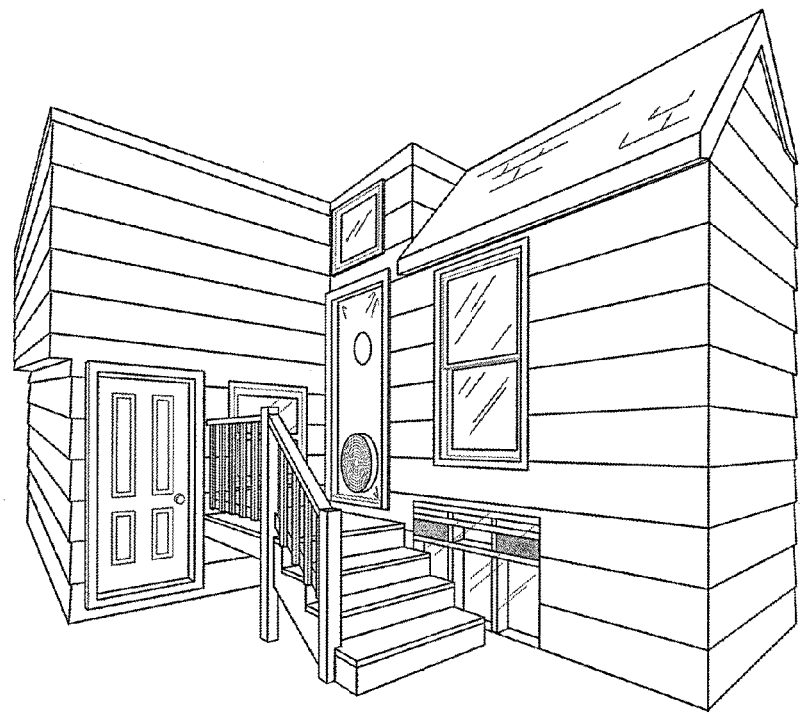
Figure 3A - PRIOR ART
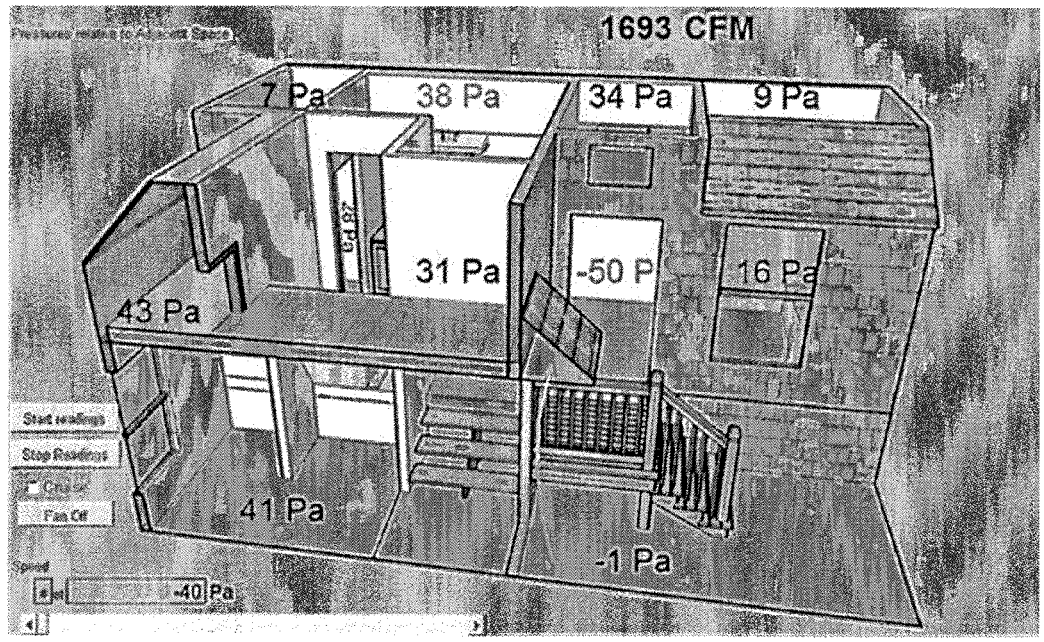
Figure 3B - PRIOR ART

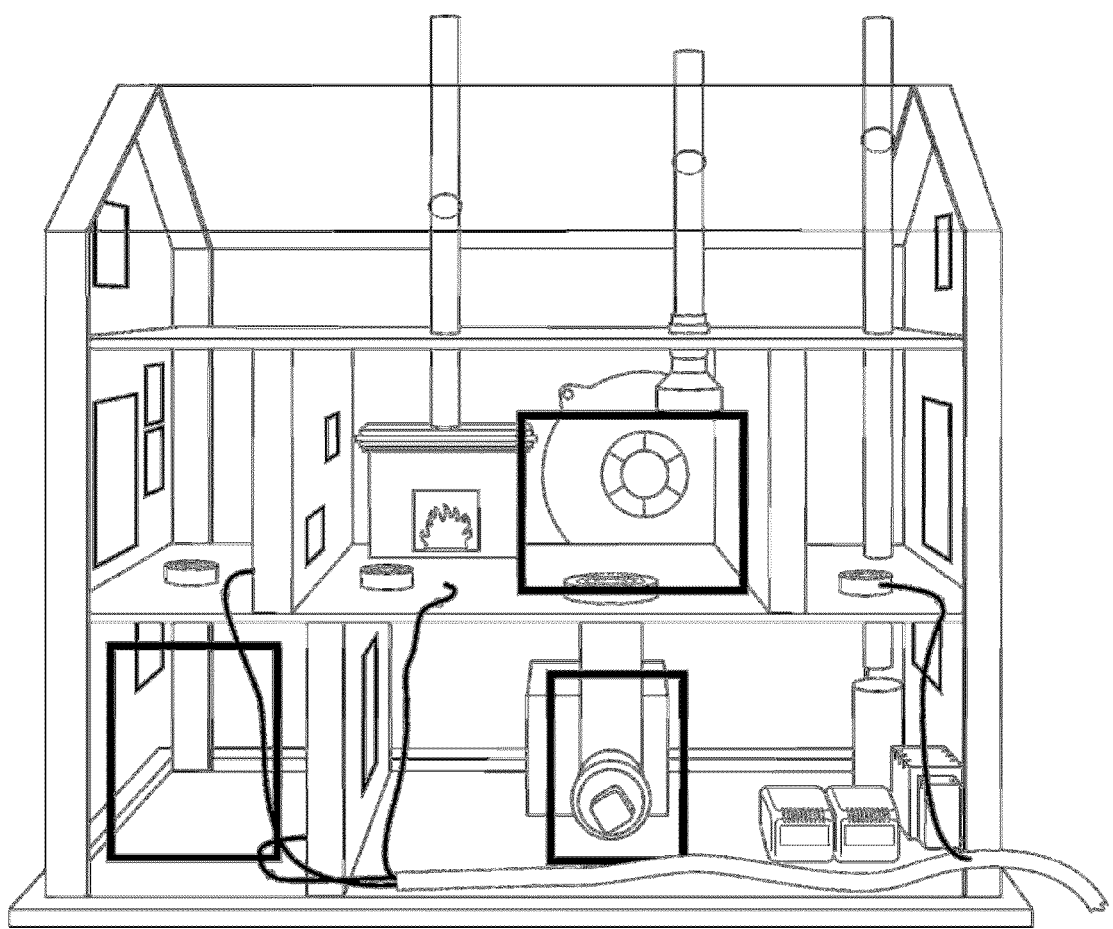
Figure 4 - PRIOR ART

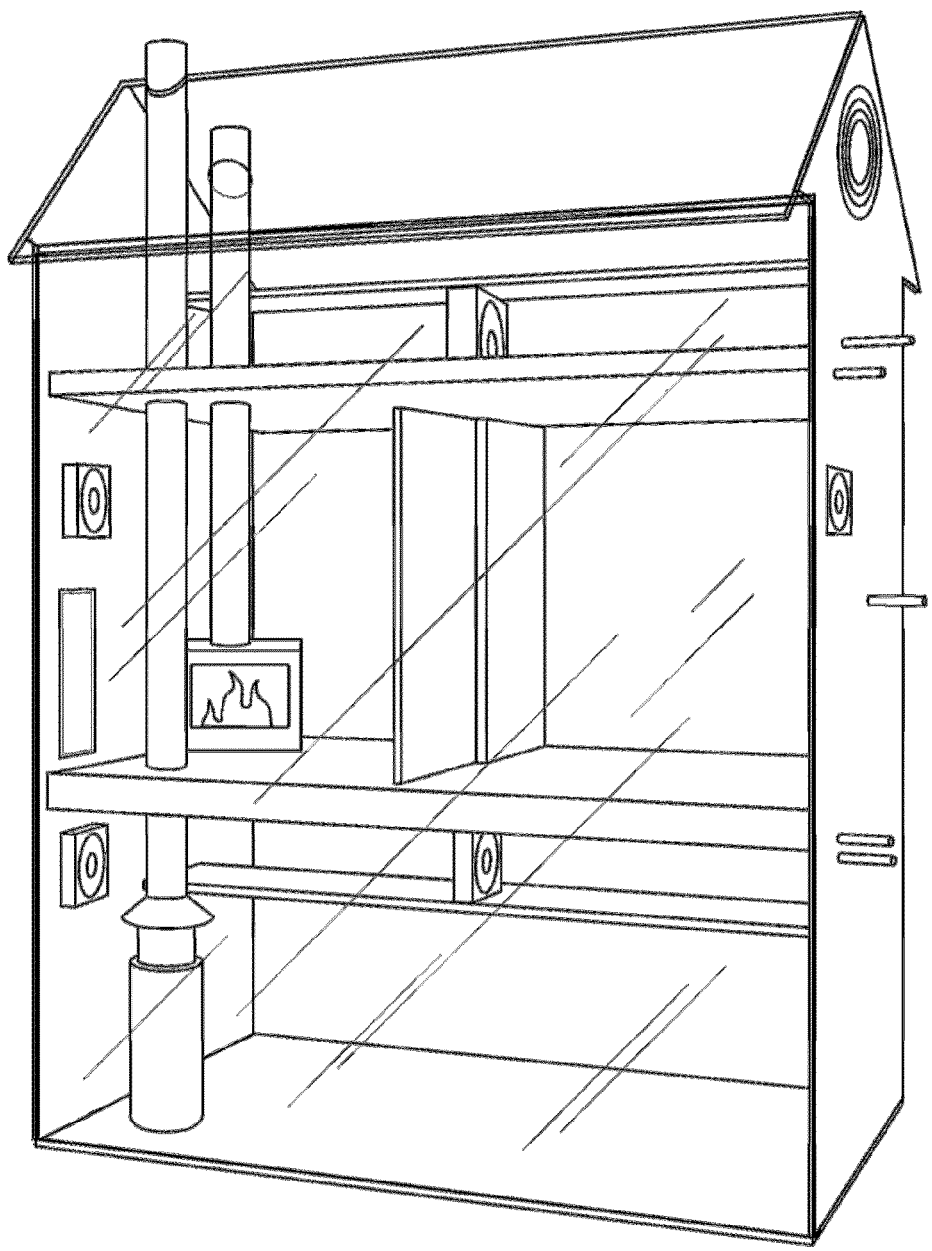
Figure 5 - PRIOR ART

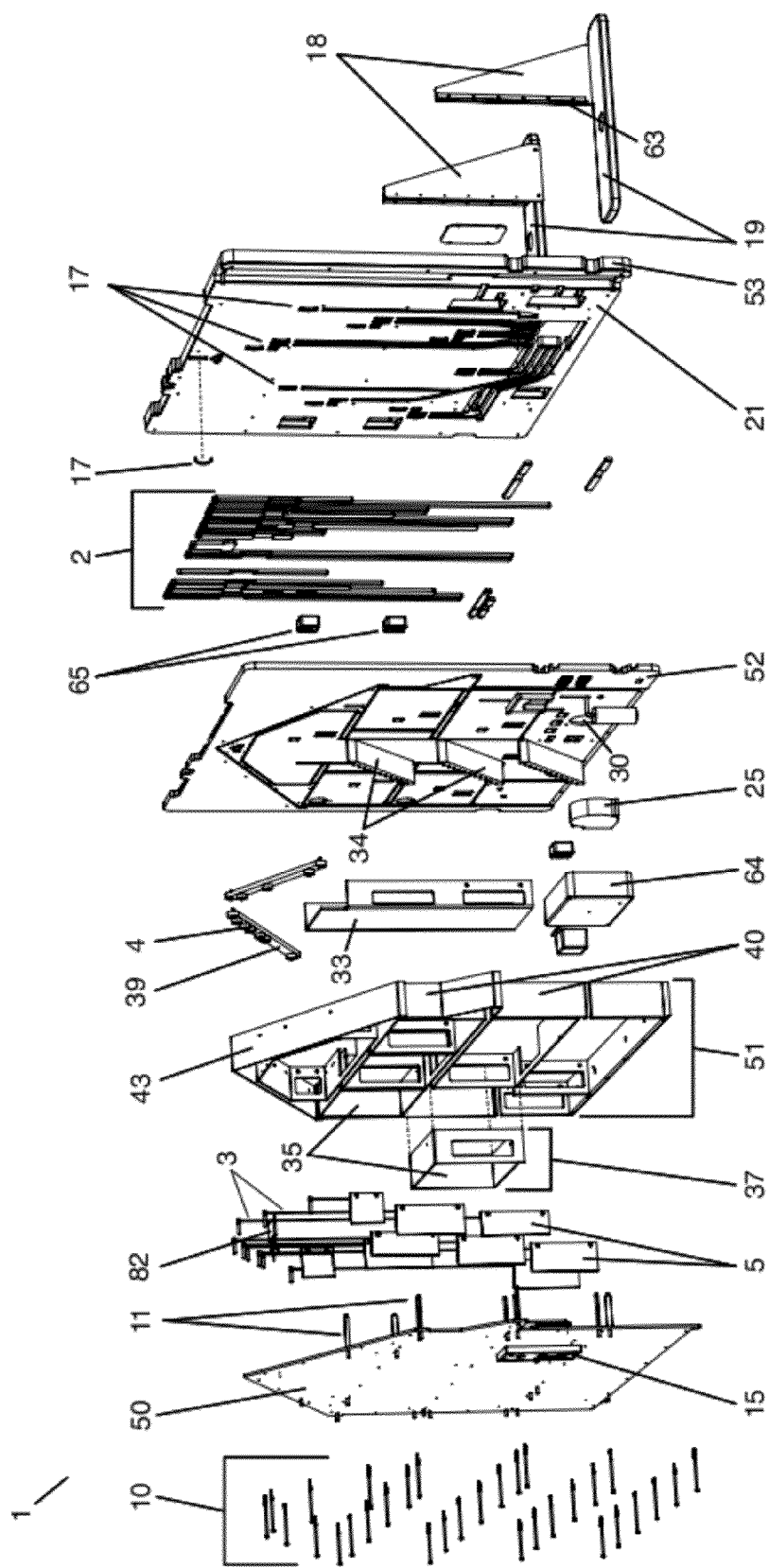

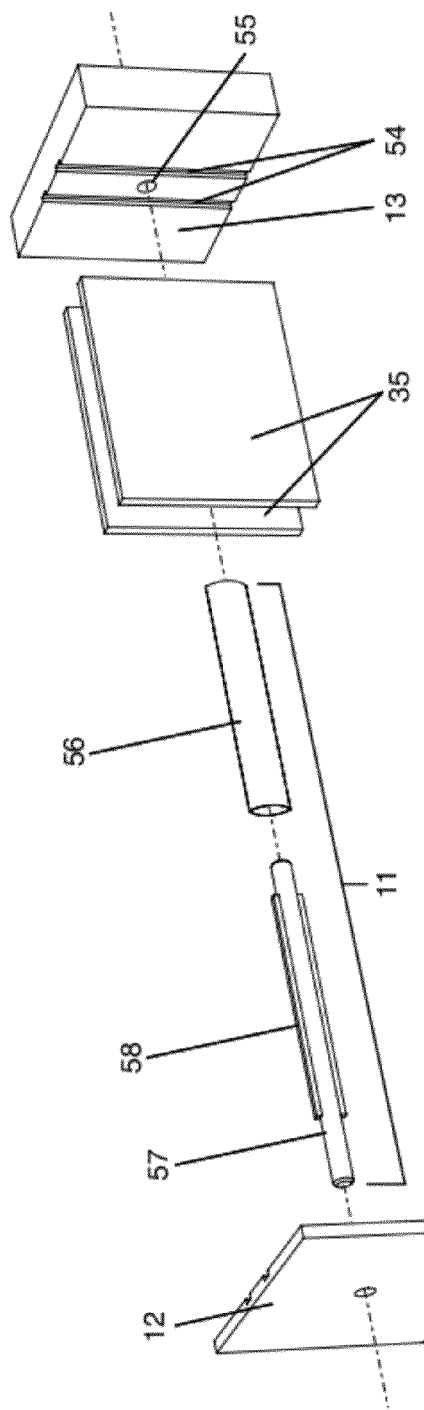
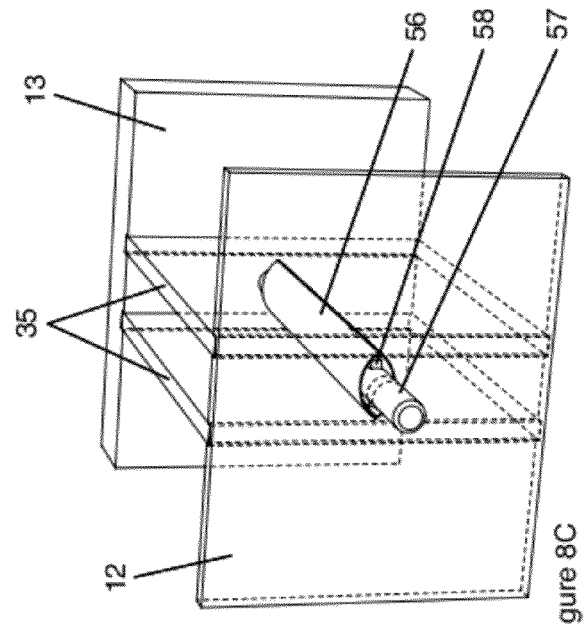
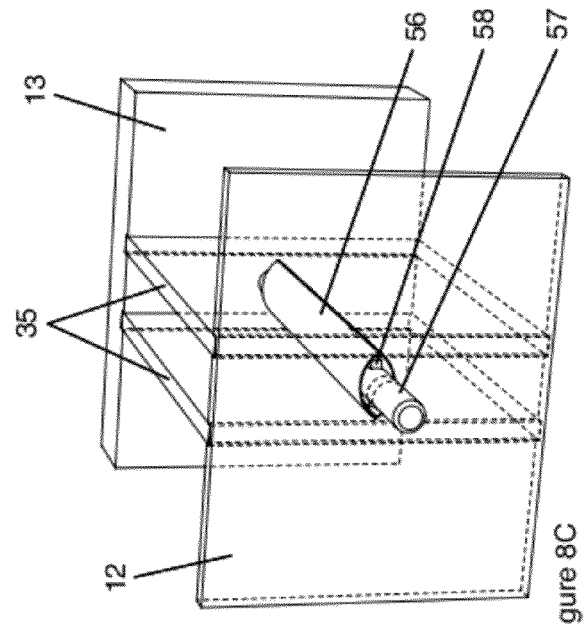

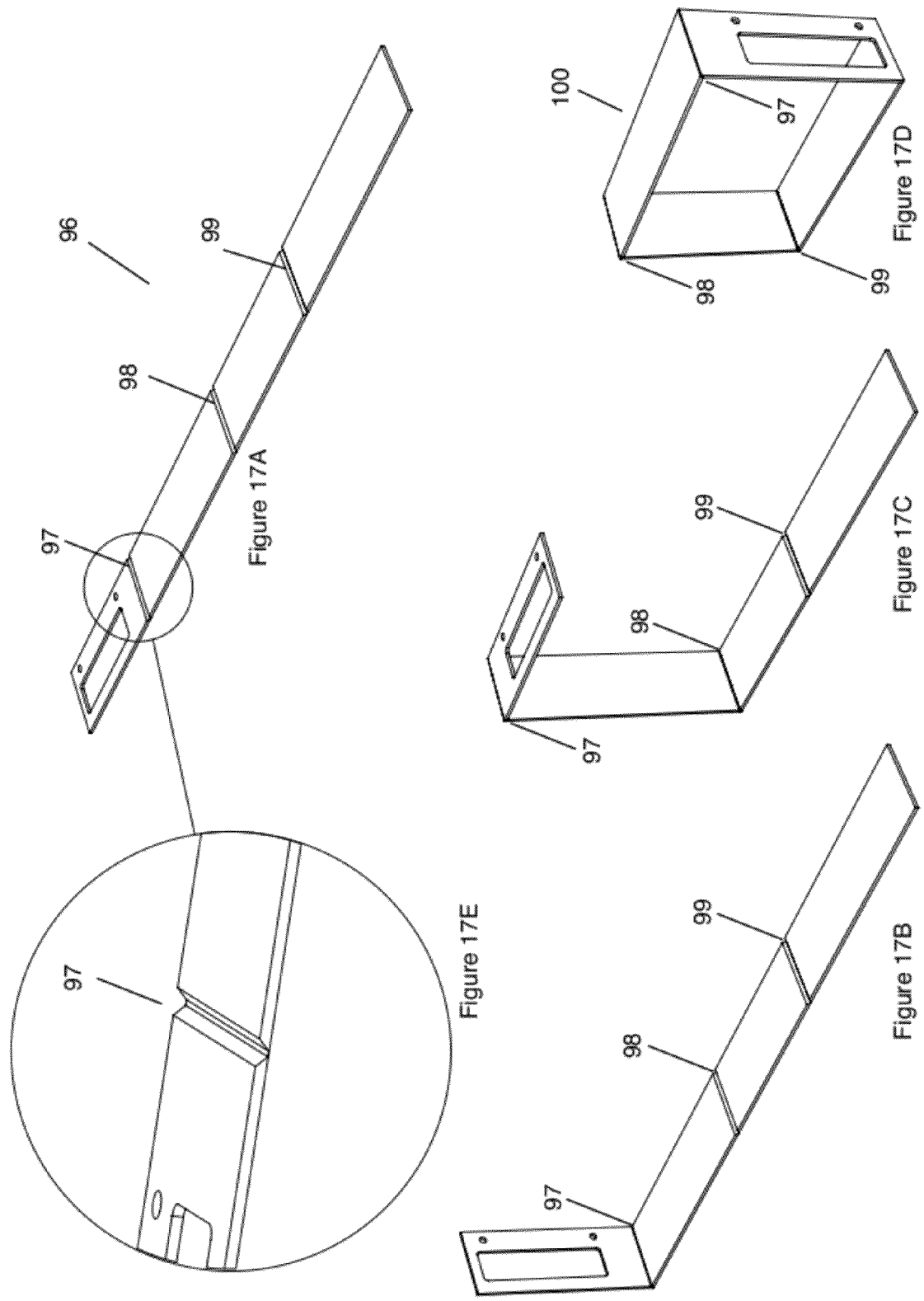

MODEL BUILDING FOR PRESSURE DIAGNOSTICS SIMULATION

REFERENCE TO RELATED APPLICATIONS

This application claims one or more inventions which were disclosed in Provisional Application No. 61/378,535, filed Aug. 31, 2010, entitled "MODEL BUILDING FOR PRESSURE DIAGNOSTICS SIMULATION". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of model buildings. More particularly, the invention pertains to model buildings adapted for zonal pressure diagnostics simulation.

2. Description of Related Art

As a result of the current movement toward making building structures more energy efficient, there is an increasing need to train building weatherization technicians for residential and commercial buildings. Model buildings are often used in the training classes as a way of demonstrating some of the many possible construction errors, air pressure imbalances, and resulting airflow problems, as well as the testing procedures used to identify those errors and problems and energy inefficiencies. The models may also be used to teach strategies for correcting those problems.

One of the primary testing procedures performed on buildings is zonal pressure diagnostics (ZPD). ZPD involves the use of a "blower door test" in which a blower door is temporarily installed in place of an exterior door of the building being tested. The blower door seals off the doorway and has a powerful exhaust fan that depressurizes the structure. By using a manometer to compare the air pressures between various interior spaces (rooms, wall cavities, attic, basement, crawl spaces, knee walls, etc.), as well as between interior spaces and the exterior environment, and the flow rate through the blower door fan, it is possible to determine the airtightness of the building and the location of leaks.

There are also other testing procedures frequently used in pressure diagnostics. One of these procedures is duct diagnostics, which includes duct airflow balancing, checking for blocked ducts, leaky ducts, and the use of a blower door, duct diagnostic fan (a fan used to pressurize or depressurize air ducts), and air handler (furnace and/or central air conditioner) to determine leakiness of ducts to outside (also known as delta Q). Another procedure is "add-a-hole, subtract-a-hole". This procedure quantifies the amount of leakage in a particular zone. Combustion Appliance Zone (CAZ) testing is a procedure for determining if combustion appliances (furnace, water heater, etc.) will operate safely in all conditions of weather and worst-case depressurization. Worst-case configuration is a process for determining the configuration of doors and air handlers that causes the greatest depressurization in the CAZ, which in turn can cause chimneys to back draft. Targeted air sealing uses zonal pressure diagnostic techniques to determine where to focus air-sealing measures.

Currently, the model buildings used in training classes are typically one of two types: compact human-scale models or scaled-down tabletop models.

Compact Human-Scale Models

One example of a human-scale model is the Telltale House, which is no longer in production, shown in FIG. 1. Another example of a human-scale model, shown in FIG. 2, is the Pressure House by Elliot Management Consulting (Bozeman, Mont.). FIGS. 3A and 3B show an outside and cutaway view, respectively, of another example, the NYSWDA (New York State Weatherization Directors Association) Pressure Diagnostics Training House.

By using full-scale components in its construction (e.g. doors, furnace, water heater. etc.), the human-scale model provides a more real-world look and feel. To some degree, this allows the instructor and students to interact with the model and perform specific tests as they might with a real building. However, to maintain a reasonable cost for fabrication, it is necessary to limit the scope and complexity of the building structure and air handling system. The result is a compact model that demonstrates some specific training concepts well, but lacks the complexity of an actual building with multiple rooms, windows, doorways, air ducts, exhaust fans, and interstitial cavities (i.e. the space inside walls, floors, ceilings, etc.). With the human-scale model, it is also difficult for the viewer to see all of the elements at play in the diagnostic process because many of the features are hidden from view.

Scaled-Down Tabletop Models

The tabletop models, in addition to being lower-cost and more easily transported than the human-scale models (many which are not transportable at all), have the potential to illustrate, in a classroom setting, many of the issues found in the field. The small size of these models also provides a comprehensive view of the building at a glance. The challenge is to create a model that can provide an effective simulation of airflow problems among multiple rooms and interstitial cavities while maintaining a relatively low production cost, as well as a more reasonable size and weight for transport.

One example of a tabletop model is the House of Pressure (New River Center for Energy Research and Training, Christianburg, Va.), shown in FIG. 4. Another tabletop model, shown in FIG. 5, is the Mad Air house (no longer in production).

In an effort to reduce fabrication time and control production costs in both the human-scale and tabletop models, the building structure and air handling are simplified compared to actual building structures. There are fewer air ducts, doors, and interstitial cavities (wall and ceiling cavities). While some simplification is desirable to clarify the concepts being taught, the existing prior art models are oversimplified making it difficult to convey the complex interaction among the various pressure zones in an actual building structure and to correlate model simulations with real building characteristics.

SUMMARY OF THE INVENTION

A model pressure building simulates conditions that are helpful in teaching pressure diagnostics and weatherization strategies for residential and commercial building structures. The model building is designed for ease of fabrication and ease of assembly. The design allows the instructor to simulate numerous construction errors, airflow problems, air sealing strategies, and testing procedures while in a classroom setting.

BRIEF DESCRIPTION OF THE DRAWINGS

FIG. 1 shows a prior art compact human-scale model building.

FIG. 2 shows another prior art compact human-scale model building.

FIG. 3A shows another prior art compact human-scale model building.

FIG. 3B shows a cutaway of the model building shown in FIG. 3A.

FIG. 4 shows a prior art tabletop model building.

FIG. 5 shows another prior art tabletop model building.

FIG. 7A shows a front exploded view of the layered construction of a model building in an embodiment of the present invention.

FIG. 8A shows an exploded view of a bypass valve and portions of wall panels in an embodiment of the present invention.

FIG. 8B shows a view of an assembled and installed bypass valve in an open position an embodiment of the present invention.

FIG. 8C shows a view of an assembled and installed bypass valve in a closed position in an embodiment of the present invention.

FIG. 17A shows a single panel that can be used to make a room in an embodiment of the present invention.

FIG. 17B shows the foldable single panel of FIG. 17A with a first fold.

FIG. 17C shows the foldable single panel of FIG. 17B with a second fold.

FIG. 17D shows the foldable single panel of FIG. 17C with a third fold, creating a four sided-room.

FIG. 17E shows a blown up view of one of the folds of the foldable single panel of FIG. 17A.

DETAILED DESCRIPTION OF THE INVENTION

Figure 6:
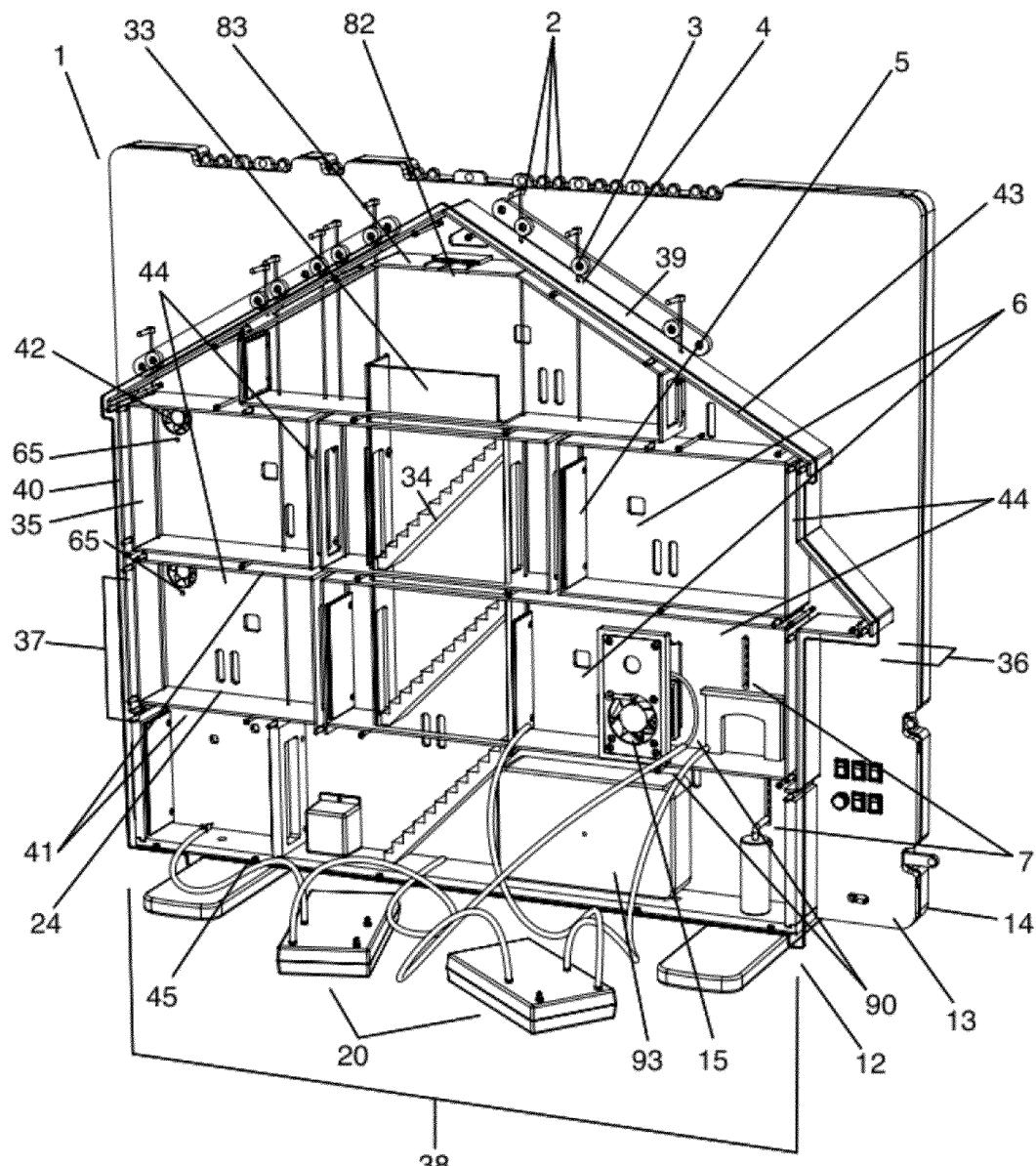
FIG. 6 shows a model building in an embodiment of the present invention.

The current invention is a model pressure house that employs a number of cost-effective fabrication methods, and design features that are improvements over current human-scale and tabletop model buildings used in weatherization training. These innovations make it financially and physically feasible to produce a model that more accurately replicates the complex problems a technician is likely to face in the field. The model can be easily reconfigured to produce scenarios that imitate various airflow and air pressure problems, as well as leaks, obstructions, testing procedures, and remediation techniques.

While the model is designed to replicate the complexity and pressure readings found in real-world building structures, the design also facilitates experimentation, exploration and easy viewing of all features. The accurate modeling of real-world scenarios, coupled with ease of use, make this design a more effective teaching tool than products currently available.

The model building disclosed herein includes a number of improved production methods. The primary components are preferably assembled in a layered format. For example, the front-to-back room panels are captured or sandwiched between the front and back walls. The panels that run from the front wall to the back wall are captured by the front and back walls by the grooves cut in them. In one embodiment, the air ducts are cut only in the back wall and the back panel is used to cover and seal the air ducts from each other and external air. In one example of this embodiment, the back wall is preferably approximately 0.5" thick and the back panel is approximately 0.25" thick.

In addition, the front and back walls preferably have recesses, such as grooves and/or holes, to capture the panels and other components running from front to back. This speeds the assembly of the model building for use. This also makes the assembly self-fixturing, requiring less time to assemble. Self-fixturing or self-aligning are common terms used in manufacturing meaning that the components nest together in such a way that they are properly aligned before bolting or gluing without the need for fixtures, clamps, straps, etc. The panel-in-groove joints also create better air sealing.

The box-type (substantially square or rectangular, with the exception of the room(s) on the top floor, which follows the contour of the roof) inherently creates interstitial cavities in various areas of the house, including, but not limited to, the ceiling, the interior walls, the exterior walls, the roof, and the knee wall. This more closely simulates actual building construction and airflow scenarios without requiring complex manufacturing methods to produce the model.

Bypass valves, which are preferably butterfly valves, are preferably used to simulate leaking (open position) and sealed (closed position) interstices. A flexible sealing component of the valves preferably has a football shaped cross-section. The sealing component, which is preferably a flexible sealing and floating component, fits over the rotatable positioning shaft. The shaft has ribs running lengthwise on opposite sides which force the sealing component to rotate with the shaft, yet move slightly freely as needed to provide maximum seal against panels of the interstitial cavity. Flexible and floating sealing components are low-cost and effective. In some preferred embodiments, these components are made of a low-cost plastic extrusion.

Folded structural panels are preferably used where possible rather than assembling multiple panels. Cutting a v-groove where a fold is desired creates a living hinge. This fabrication method allows the use of a thicker, more rigid material for wall construction while still having the benefits of folded corners. As a result, there are no air leaks at corners where the panels meet and no sealing is required. In addition, there are fewer parts to handle during assembly. The living hinge precisely positions the fold, making folding easier. The hinge also creates a tighter corner and allows for better air sealing.

In preferred embodiments, a plastic material is chosen for the panels because plastic can have a v-groove cut in it and be folded without cracking. In other preferred embodiments, a 70% recycled plastic is used, which is an environmentally responsible material that creates an energy efficient product, an important consideration for the intended market.

Some of the features of the model building are preferably machined into fabrication materials rather than being fabricated as discrete components. These features are preferably designed to be machined by CNC (computer numerically controlled) machining (or manual router with templates). As a result, there are fewer parts to make, stock, and assemble. This reduces costs. It increases the number of possible features without significantly increasing costs. Some features that could be machined in embodiments of the model building include, but are not limited to, supply and return air ducts, shut-off slides (for air ducts, windows, and interstitial bypasses) with stop-block notch, channels for shut-off slides with stop-block, windows, window channels, and slides, and front to back panels fit into grooves cut in front and back walls. Machining the components in this manner results in better air sealing, and self-fixturing during assembly.

In preferred embodiments, corrugated plastic sheets are used for sliding and hinged doors. Corrugated sheets are made from two outer layers with a corrugated layer between the two outer layers. Corrugated cardboard, for example, is made of fluted paper glued between two sheets of paper. Flutes are the parallel hollow channels within the corrugated layer. The term "flute" typically means an exposed groove or channel on a surface, but "flute" was carried over to the corrugated plastic industry to include the channels enclosed within the corrugated layer.

The hinged door is formed from a panel of corrugated material, which is split into a door section and a mounting section, separated by cutting through only one of the outer layers along a flute of the corrugated layer, so that the remaining outer layer and the material of the corrugated layer form a "living hinge" for the door. Flutes allow easy attachment to an external control rod, easy addition of vents to the door if needed, and easy addition of guide rails on sliding doors. The lightweight construction of the doors helps keep the overall weight down and facilitates transport of the model building. The use of a living hinge provides a low-cost hinge with precise movement.

Air handler return ducts are preferably cut in the back wall and lead to the center of the return plenum. The supply ducts are positioned at the perimeter of the supply plenum. Because of this arrangement, there is typically no need for supply and return air ducts to cross because they can normally run parallel to each other which allows them to be machined in the back wall as part of the CNC process. This generally radial layout of supply and return ducts around the supply and return plenum obviate the need for crossover between the supply and return ducts. The radial layout is in turn made possible with an air handler that moves air in a direction that is generally perpendicular to the panel containing the supply and return ducts. In other embodiments, the design would be reversed. In these embodiments, the supply ducts would be located in the center and return ducts would be located around the perimeter.

The model building disclosed herein also includes many improved training features compared to the prior art. Reduced cost per feature allows additional features with little or no increase in production cost beyond the cost of additional CNC cuts. Features such as additional rooms, interstices, air ducts, and exhaust fans allow for greater complexity and interaction of various elements, resulting in a more realistic representation of real-world scenarios.

The model building is also preferably a thin model, which is one room deep, and thin in depth compared to the width. A model building that is one room deep and with a thin depth gives better visibility of the all elements of the model in a classroom setting. A thin model is also easier to transport. In one preferred embodiment, the model building includes at least two capture layers (the front wall and the back wall) and a middle layer (the rooms layer) between the capture layers, where a ratio of a width of the model building to a depth of the model building is greater than 5:1. In a further preferred embodiment, the width of the model building to the depth of the model building is greater than 8:1.

Butterfly valves are preferably used to simulate partial or full leaking (open position) and sealed (closed position) interstices. Using butterfly valves permits the simulation of complex airflow scenarios, which more closely simulates actual building construction and airflow scenarios. The selected placement of bypass valves in specific locations in the interstices allows the user to simulate either balloon-frame construction with open cavities from basement to attic, typical of older homes, or platform construction in which floors built on exterior walls for each floor seal wall cavities between floors, typical of more contemporary homes. The valves also allow the user to simulate targeted air sealing to correct various airflow or air leakage problems.

In preferred embodiments, exhaust fans preferably have a cover flap that can be locked open, locked closed, or allowed to move freely to serve as a check valve to replicate any of three possible scenarios in a real-world setting. In other preferred embodiments, placement of a Venturi port on the blower door measures air speed and allows the calculation of a volume of air that moves in a given period of time. This can simulate measurement of cubic feet per minute (CFM).

In other preferred embodiments, an Electronic Air Flow Indicator (AFI) gives a visual representation of air speed and direction preferably with the use of a sequence of "chasing" lights. The lights are preferably light emitting diodes (LEDs). The illusion of flowing smoke is created by the gradual brightening and dimming of LEDs in the sequence. This provides a visual indication of correct or incorrect chimney draft or other airflow issues. The AFI can give a visual representation of air pressure in various portions of the model, since airflow results from a pressure differential. This permits the user to instantly see and compare pressures in various parts of the model.

In other preferred embodiments, feet are attached to the model to prevent it from tipping since it is so thin. The feet preferably fold out of the way but remain attached. This creates a more stable model building and increases ease of storage and transport. Since the feet are attached, they can not be left behind when the model building is transported to another location.

Figure 7B:
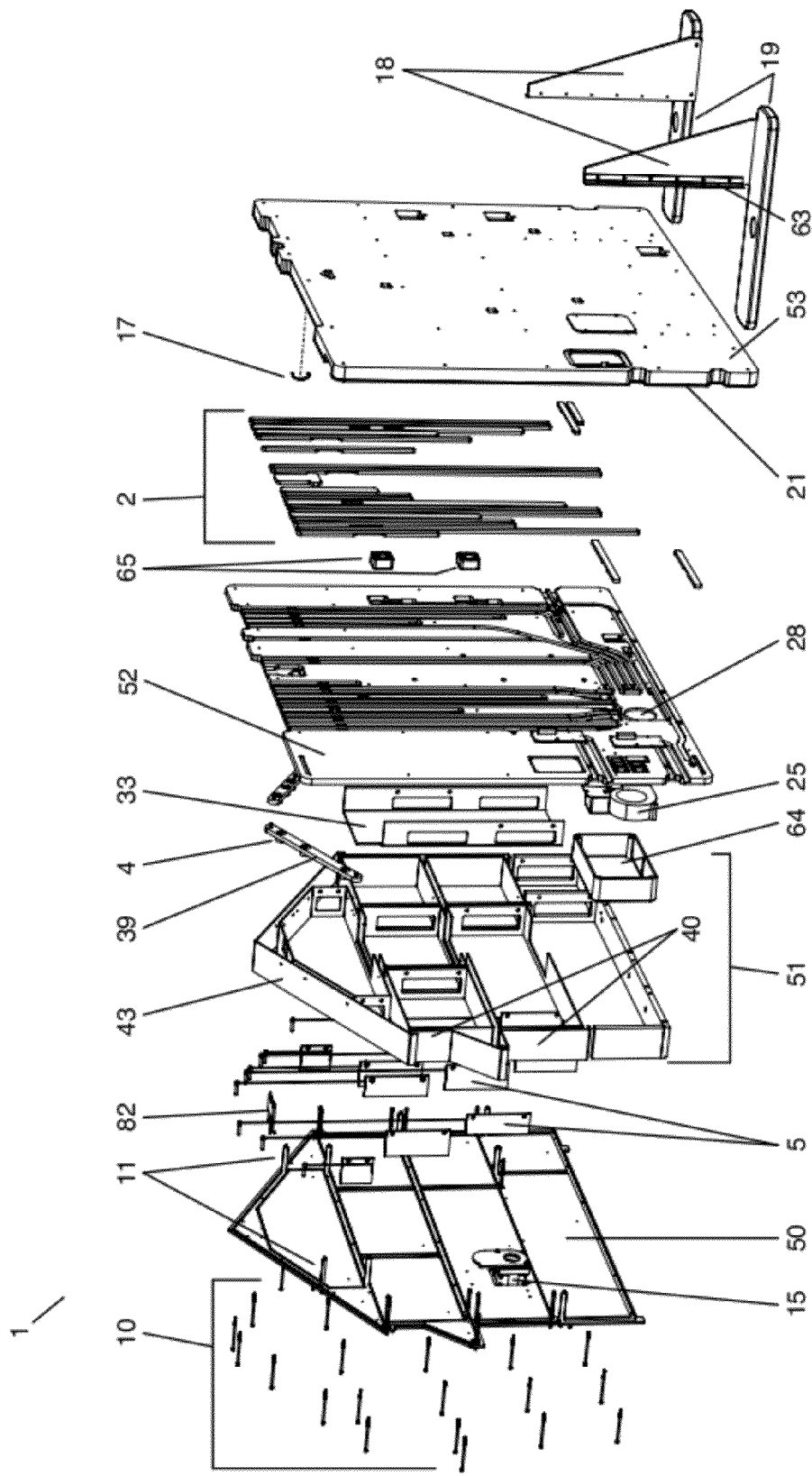
FIG. 7B shows a back exploded view of the layered construction of a model building in an embodiment of the present invention.

FIGS. 6, 7A and 7B show a model building 1 in an embodiment of the present invention. The overall structure of the tabletop model building 1 shown in FIGS. 6, 7A and 7B is only one room in depth 36 from front to back. The combined innovations in the design of elements such as the building structure, doors 5 or 82, bypass valves 11, air ducts 31 (supply), 32 (return), shut off slides 2 and air handler 93 in the model building 1 described herein, allow for a thinner model (measured from front to back, depth 36 compared to width 38) compared to existing prior art model buildings, which improves visibility. The air handler 93 includes the supply plenum 64, the return plenum 29, and the fan 25, which are shown in FIGS. 7A, 7B and 10B. FIG. 10B also shows an air handler supply port 46. The ratio of the model's width 38 to depth 36 is preferably greater than 5:1. This allows all of the instructional elements (rooms 37, doors 5, interstitial cavities, etc.) to be easily visible from the front of the model 1. This is ideal for multiple viewing angles in a classroom setting.

The assembly process and structure described herein is unique among the models used in the weatherization training field. The model building 1 includes a back wall 13 and a clear front wall 12 that are drawn toward each other with fasteners 10 (such as bolts), adhesives (such as glue), or an interference fit (such as a snap-fit). Captured between the back 13 and front 12 walls are all of the interior wall panels 35, exterior wall panels 40, floor 41, ceilings 42, roof structures 43, and other model components that run from front to back in the model.

Each room element 37 is preferably essentially a box structure that is open in the front and back prior to assembly. The interstice of an actual house is represented by the space 44 between a room structure and adjacent model structures such as exterior wall panels 40, roof 43, and other rooms 37.

FIGS. 7A and 7B show the layered configuration of the model building 1. The basic structural configuration in the preferred embodiment has four layers 50, 51, 52, and 53. The four layers, from front to back, are: a front wall layer 50, a room layer 51, a back wall layer 52, and a back panel layer 53. Other numbers of layers are also possible, but there are preferably at least three layers. In one alternative embodiment, there are three layers: a middle layer (the "room" layer 51) and two "capture" layers 50, 52. In this alternative embodiment, the middle layer includes all structures running from the first to the second capture layer. The structural elements and other design features of the middle layer are secured between the two capture layers in this alternative embodiment.

In another alternative embodiment, instead of a single layer 51 of rooms 37, the model could have multiple layers of rooms 37 with an added dividing wall for each new layer to more accurately replicate the multiple rooms in actual building configurations. In another alternative embodiment, instead of stacking layers horizontally, layers can be stacked vertically. This configuration would allow a more accurate replication of actual building construction with multiple floors and a unique floor plan for each floor.

The "rooms" layer 51 preferably includes all of the panel structures and other design elements that run between the front 12 and back 13 walls of the model. This includes, but is not limited to, such structures as interior wall panels 35, exterior wall panels 40, floors 41, ceilings 42, roof 43, and bypass valves 11 (in interstitial cavities 44). A standard "room" is preferably formed by four panels (two interior wall panels 35, a floor panel 41 and a ceiling panel 42) creating a box that is open in the front and back. A "room" 37 can be created by any number of panels, three or greater. Two or more rooms 37 can be captured between the front 12 and back 13 walls creating multiple enclosures. Exterior wall panels 40 and roof panels 43 are also preferably captured between the front 12 and back 13 walls.

Stairs 34 attach to the back wall 13, and preferably do not run all the way to the front wall 12. The stairs 34 preferably extend approximately ½ the distance between the front wall 12 and the back wall 13 of the model building 1. The stairs 34 are enclosed in a stairwell 33 (see FIG. 7A). The stairwell 33 allows air to flow between floors, similar to airflow in an actual house. Doors on the stairway 33 allow airflow to be restricted or shut-off.

For the purposes of this application, a distinction is made between a "wall" and a "wall panel". A "wall panel" is defined as a panel that separates an interior or exterior space from the interstitial cavity of the wall. A "wall" is defined by two adjacent "wall panels" and the interstitial cavity 44 contained between them. Similarly, a "roof" section is typically defined by "roof panel", "ceiling panel", and an interstitial cavity; a "floor" section is defined by a "floor panel", "ceiling panel", and an interstitial cavity. Exceptions to this definition are the front 12 and back 13 walls and the basement floor 45, which are predominantly solid with no interstitial cavity.

In addition to the room panels, components such as exterior wall panels 40, roofs 43, interstitial bypass valves 11, etc. that extend from the front wall 12 to the back wall 13 are captured between the front 12 and back 13 walls. In preferred embodiments, the front 12 and back 13 walls are drawn toward each other by fasteners 10. This reduces or eliminates the need for additional fasteners or bonding agents beyond the fasteners that join the front 12 and back 13 walls. Bolts are preferred and shown in the figures, but the walls could be held by other types of fasteners including, but not limited to, screws, connecting rods, and zip ties. Components could also be held together with some type of adhesive.

In alternative embodiments, rather than using fasteners to draw the front and back walls toward each other, each wall may be mechanically fastened, chemically bonded or fused to structural elements of the middle layer. In embodiments using chemical bonding, adhesives may be used. In embodiments using fusing, plastic or other material may be directly fused together using a method such as sonic welding. In other embodiments, an interference fit (including, but not limited to, a press fit, a friction fit, or a snap fit) may be used. An interference fit is a fastening between two parts achieved by friction after the parts are pushed together, rather than by any other means of fastening. A snap fit maintains a connection between two parts by causing an undercut on one part to engage with an undercut in another such that the two parts cannot be separated without forcibly moving the undercuts past each other.

Front 12 and back 13 walls preferably have grooves 54 and holes 55 to receive and secure panel components (e.g. floors 41, wall panels 35, 40, ceilings 42, and roofs 43) and other design elements (e.g. interstitial valves 11). This method of attachment provides self-fixturing assembly ensuring proper component alignment without the need for fixtures or clamps. This method also provides a better air seal than simply abutting components against the front and rear wall surfaces. Proper air sealing is critical for producing valid and consistent air pressure readings.

The model building preferably has a thin cross-section with a width 38 to depth 36 ratio of greater than 5:1. In a preferred embodiment, the ratio is greater than 8:1. The thin cross-section allows better visibility in a classroom setting from multiple viewing angles. The thin profile also results in lighter weight and easier transport in the back seat or trunk of a car. The model 1 is scalable to a larger classroom wall size with minimal projection into the classroom.

The model building 1 includes interstitial cavities 44, which simulate actual structures. The space 44 created between a first room panel and an adjacent room panel, exterior wall panel, roof panel, or floor panel replicates the interstitial cavities of an actual building structure (for example, the cavities between roof rafters, floor joists, wall studs, etc.). The model building 1 includes interstitial cavities 44 in the walls, floors, roof, and knee wall, and allows user controlled airflow among them. The nature of real-world construction automatically creates these interstices 44 and it is simply a matter of the designer/builder deciding where to allow the air to flow, and where to seal off airflow. The ability to demonstrate airflow through leaks in interstitial cavities 44 in the model, and the ability to seal off this airflow as desired, is critical to teaching the complex airflow scenarios in an actual house and how to address problems.

The model building also preferably includes interstitial bypass valves 11, which are shown in FIGS. 7A, 7B and 8A-8C. Bypass valves 11 located at key points in the interstitial cavities 44 of the model 1 are preferably butterfly valves that allow the instructor and students to simulate air-sealing techniques used to block unwanted airflow in a building structure. The bypass valves 11 may have any cross-section longer than it is wide, including, but not limited to, elliptical, or diamond-shaped cross-sections. The valves 11 preferably include an expanding flexible football-shaped valve cross-section, which can be seen in FIGS. 8A-8C. A football-shaped extrusion valve seal can flex as needed when turned to the closed position to create a more effective seal against panels of an interstitial cavity 44. A flexible sealing component 56 preferably has the football shaped cross-section. In some preferred embodiments, the sealing component 56 is a flexible and floating sealing component 56. The sealing component 56 fits over a rotatable positioning shaft 57. The shaft 57 has ribs 58 running lengthwise on opposite sides which force the sealing component 56 to rotate with the shaft 57, yet move slightly freely as needed to provide maximum seal against panels of the interstitial cavity 44. Flexible and floating sealing components 56 are low-cost and effective. In some preferred embodiments, these components are made of a low-cost plastic extrusion. The valve preferably extends the full depth of the interstitial cavity such that, when closed, it completely seals off the interstitial cavity. When the valve is open, the full depth of the cavity allows airflow.

To the Applicant's knowledge, a butterfly valve has never been used in the interstitial cavities of a human-scale or tabletop model pressure house to seal off sections of the interstitial space. The valves 11 also allow the user to simulate targeted air sealing to correct airflow problems in interstices 44. Bypass valves 11 also allow the model to simulate either balloon-frame or platform construction.

Using a butterfly valve allows the full depth of the interstitial cavity to be sealed or opened as needed. Valves that seal off or open an entire cross-section of an interstitial cavity would be a benefit in both the tabletop and human-scale model pressure houses. Alternate embodiments may include valves that open some portions of the depth of the interstice. In one preferred embodiment, the valves open approximately 50% or more of the depth of the interstice. In another preferred embodiment, the valves open approximately 50% or less of the depth of the interstice. In another alternate embodiment, a half-butterfly or flap valve may be used to control airflow in the interstice. In this embodiment, the valve is a rectangular valve and the valve's rotational control shaft pivots against one panel of the interstice rather than in the center of the interstice (as with the butterfly valve). In this embodiment the valve can lay flat against a room panel thereby moving the valve completely out of the airstream.

In other embodiments, the bypass valves could be any valve that can open or close off an interstitial cavity, including flexible flaps or rigid flaps that close against seals, or other designs that create the same effect by opening or closing off an interstitial cavity.

In preferred embodiments of the model building 1, folded panels in the rooms layer 51 reduce fabrication cost. Rather than being formed of discrete panels, layer structures are made of single panels that are folded to create interconnected panels. As one example, a four-sided room is made of a single panel that is folded at three corners. A single foldable panel 96 that creates a four sided room 100 is shown in FIGS. 17A through 17E. A v-groove is preferably cut where each corner fold 97, 98, 99 is to be located, creating a living hinge. This accurately positions the fold without fixturing and decreases assembly time. The number of components and time required for assembly is reduced. An airtight seal is achieved at three of the four corners.

Figure 10A:
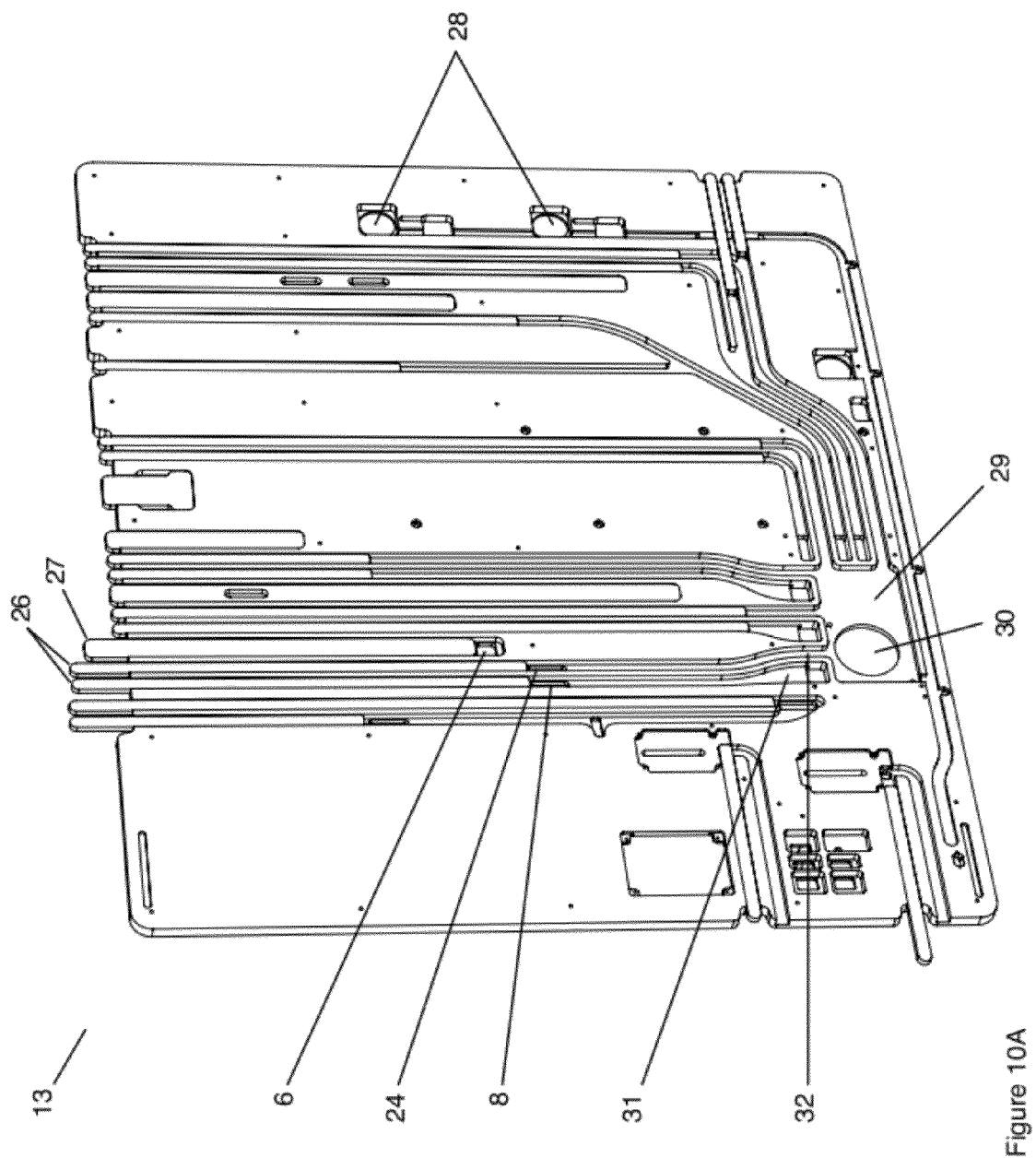
FIG. 10A shows the back wall with the shutoff slides installed in an embodiment of the present invention.
Figure 10B:
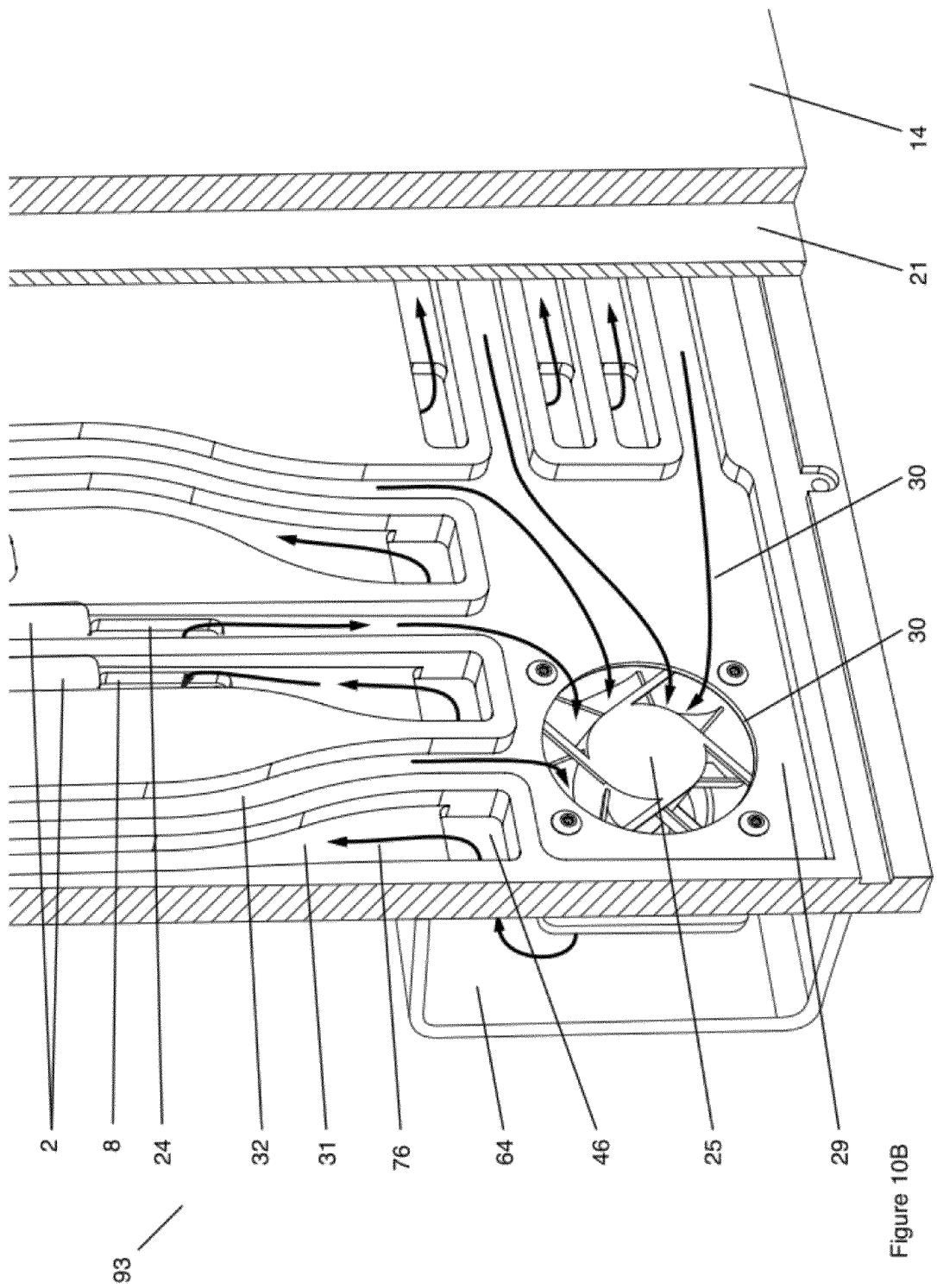
FIG. 10B shows the air handler in an embodiment of the present invention.

In other embodiments of the model building, supply 31 and return air ducts 32 are cut into the back of the back wall 13, as shown in FIG. 10A, rather than fabricated as discrete components such as a system of tubes and connecting joints. This results in reduced production costs because of reduced fabrication and assembly time. Alternatively, to get more airflow, the depth of the back panel 14 is increased. In one preferred embodiment, the depth of the back panel 14 is increased to approximately one inch. This allows adding to the depth of the air ducts by cutting channels into the back panel 14 that are aligned with the air ducts of the back wall. This more than doubles the depth of the air ducts 31, 32, allowing better air flow. Adding additional depth to the duct in a thicker back panel 14 provides better airflow without adding complexity or material to the back wall 13. Doubling the volume of the air ducts by simply making them wider would require making the model approximately twice the size. This added thickness of the back panel 14 and air duct expansion is visible in FIGS. 7A and 7B. Supply 8 and return 24 vents are openings that preferably are cut into the back wall 13 to allow the exchange of air between the room and the air ducts 31 and 32, respectively. In some embodiments, the supply 8 and return 24 ducts are also cut into the back panel 14. FIG. 10A shows the supply and return slides 26 in an open position to reveal the supply 8 and return 24 vents. FIG. 10 also shows a window slide open 27, revealing a window 6. The window slide opens 27 the room to exterior air through openings in the back wall and back panel.

The unique design of the air handler allows effective and cost effective integration of the air handler with the structure of the pressure house, the supply and return ducts, and the supply/return shut-off slides.

FIG. 10B shows the construction of the air handler 93. Return ducts 24 are preferably cut or machined in the back wall and lead to the center of the return plenum 29. The air handler fan mounted to the back wall moves air from the return plenum to the supply plenum.

The supply plenum is formed by an enclosure 64 fastened with an airtight seal to the front of the back wall. Supply ports 46 located at the perimeter of the supply plenum connect the supply plenum to end of the supply ducts which are cut into the back of the back wall. This arrangement allows supply and return ducts to be located adjacent to each other on the back of the back wall in an alternating and somewhat radial configuration. Supply and return ducts can run to each room typically with no need to cross one another or other pairs of room air ducts. This configuration also allows the air ducts, return plenum, and supply ports all to be machined in the back wall as part of a CNC machining process. In other embodiments, the airflow could be reversed, meaning that with the same physical configuration, the fan could be reversed and the air could flow in the opposite direction in the air handler, effectively reversing the role of supply and return ducts.

The return plenum of the air handler is also cut into the back of the back wall 13 allowing the return ducts to connect directly with the return plenum without the need of additional components.

The grooves cut in the back wall to form the supply and return ducts extend past their destination supply and return vents to the perimeter of the back wall. This additional groove provides a channel for the shut-off slides that control airflow at the respective vents from outside of the model.

The fastening of the back panel, preferably with gasketing material, to the back wall, seals the air handler, air ducts, and slide channels from the outside air and from each other.

A back panel 14 is fastened or bonded to the back of the back wall 13 to seal the air ducts 31, 32 from each other and the exterior air. This is done in a single operation rather than multiple operations for each duct. This reduces assembly time. A gasket sheet 21 is preferably installed between the back wall 13 and the back panel 14 to ensure a proper seal. Vents 8 and 24 are installed in the various rooms by simply cutting holes from the air ducts 31, 32 to the front of the back wall 13. Vents 8 and 24 are cut slightly narrower than the air duct to create a better seal against the shut-off slide 2.

Figure 16:
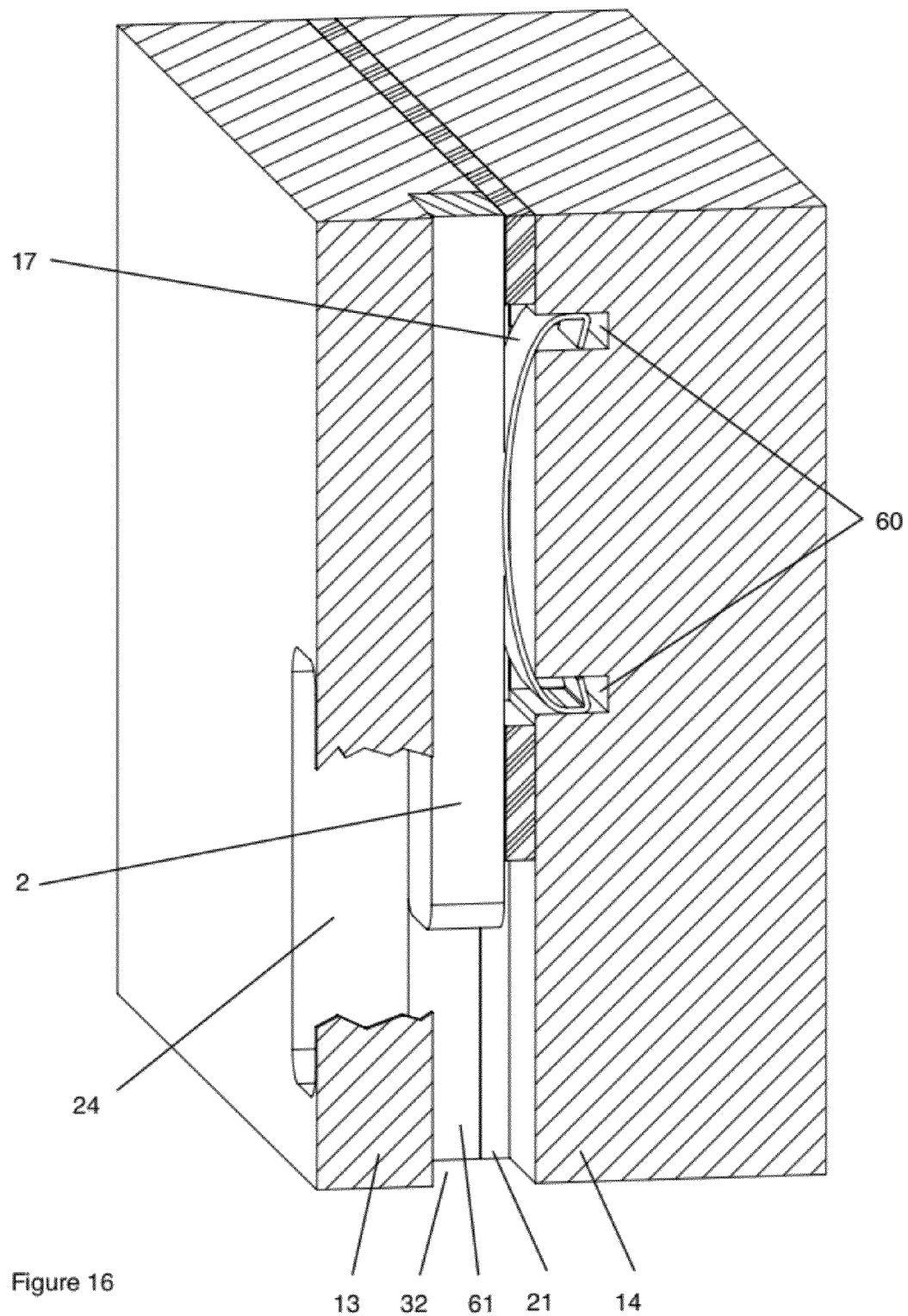
FIG. 16 shows a cut-away view of an installed leaf spring with a shut-off slide in an embodiment of the present invention.

There is a single leaf spring 17 behind each slide 2, as shown in FIGS. 7A and 16. In one preferred embodiment, the leaf spring 17 is located near the end of the slide 2 closest to the window 6 or air duct opening into the room 37, to ensure a good seal. The spring 17 is preferably made of a thin, flexible spring material such as metal or plastic. One preferred example is 0.020" polycarbonate sheet. Each end of the spring 17 fits securely into a groove 60 cut into the back panel 14. The spring spans the two grooves 60 such that it forms a compressible arch pressing against the slide 2. Each end of the spring 17 is bent back toward itself forming a kind of barb to more fully secure the end of the spring 17 in the slot 60. The design is low cost and very effective.

This spring 17 serves several purposes. It presses the slide 2 against the front of the groove 61, ensuring a tight fit between the slide 2 and the groove 61 whether the slide 2 is in the open or closed position. The spring 17 pushes each slide 2 forward to ensure a proper seal against the vents 8 and 24 in the back wall 13. The leaf spring 17 is wide enough that, as it presses against the slide 2, it prevents excessive airflow between the slide 2 and the back panel 14. The spring 17 also applies consistent pressure holding the slide 2 securely in any position while still allowing easy movement. In other embodiments, other types of spring material can be used instead of a leaf spring. Some examples include, but are not limited to, a coil spring or a soft elastomeric block mounted in a recess in the back panel 14 such that it presses against the slide 2.

Figure 9:
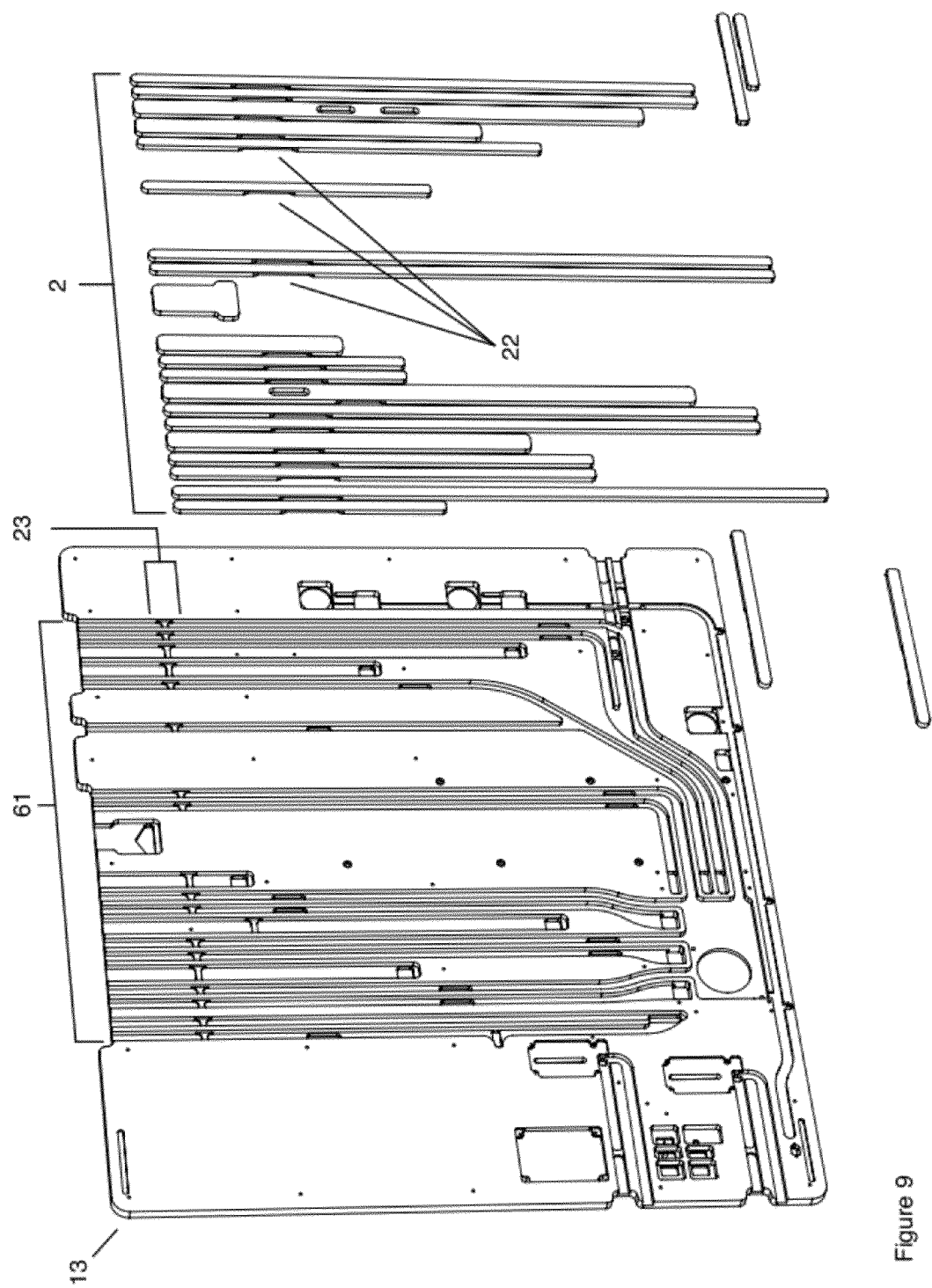
FIG. 9 shows an exploded view of the back of the back wall and shutoff slides of a model building in an embodiment of the present invention.

In preferred embodiments, the shut-off slides 2 allow vents and windows to be opened and closed from outside the model 1. Slides 2 are commonly used in the prior art, but they are normally made up of a number of components for each slide: a slide, two rails, fasteners to hold the rails, and possibly some means of stopping the slide from coming out such as a bolt or pin. In contrast, in embodiments of the present invention, the shut-off slides 2 are contained by grooves 61 cut in the back wall, as shown in FIGS. 9 and 10. Rather than adding two guide rails to hold each slide 2, the back panel 14 attached to the back wall 13 holds and seals all of the slides 2. The slides 2 extend past the edge of the back wall 13 for easy access. A stop block 23 is preferably located in each slide groove 61. A corresponding notch 22 that is longer than the stop block 23 is cut in the facing surface of the slide 2. These two elements serve to limit the range of motion of the slide 2. The stop block 23 may be installed as a separate component, but it is preferred that it be machined to reduce costs. The back panel 14 that seals air ducts also captures the slides 2. Conversely, the stop block could be part of the slide 2 and the notch 22 could be located in the groove 61.

One preferred method of fabrication for the model building is a CNC mill or router. The model building is preferably designed to facilitate fabrication using one of these methods. Compared to a more conventional fabrication process that uses discrete components for air ducts and air handler, this model building has a reduced number of components, which results in reduced fabrication and assembly time. Additional features or components can be added with little or no additional cost. In alternative embodiments, the model building may be fabricated using a traditional hand-held router and templates.

Some features that facilitate CNC machining include using materials that are primarily flat sheet stock, room layer 51 being made of a foldable panel 96 having a v-groove cut to create a living hinge for corner folds to become a room with a ceiling, floor, and two walls, grooves 54 that are cut in the front and back walls to accept and position the room layer panels, air ducts 31 and 32 that are cut in the back wall 13, grooves 61 for air duct shut-off slides 2 that are cut in the back wall 13, stop blocks 23 that are machined into slide grooves 61, and slides 2 with notches 22 for stop blocks 23 that are machined from sheet material (see FIGS. 9 and 10).

Figure 11:
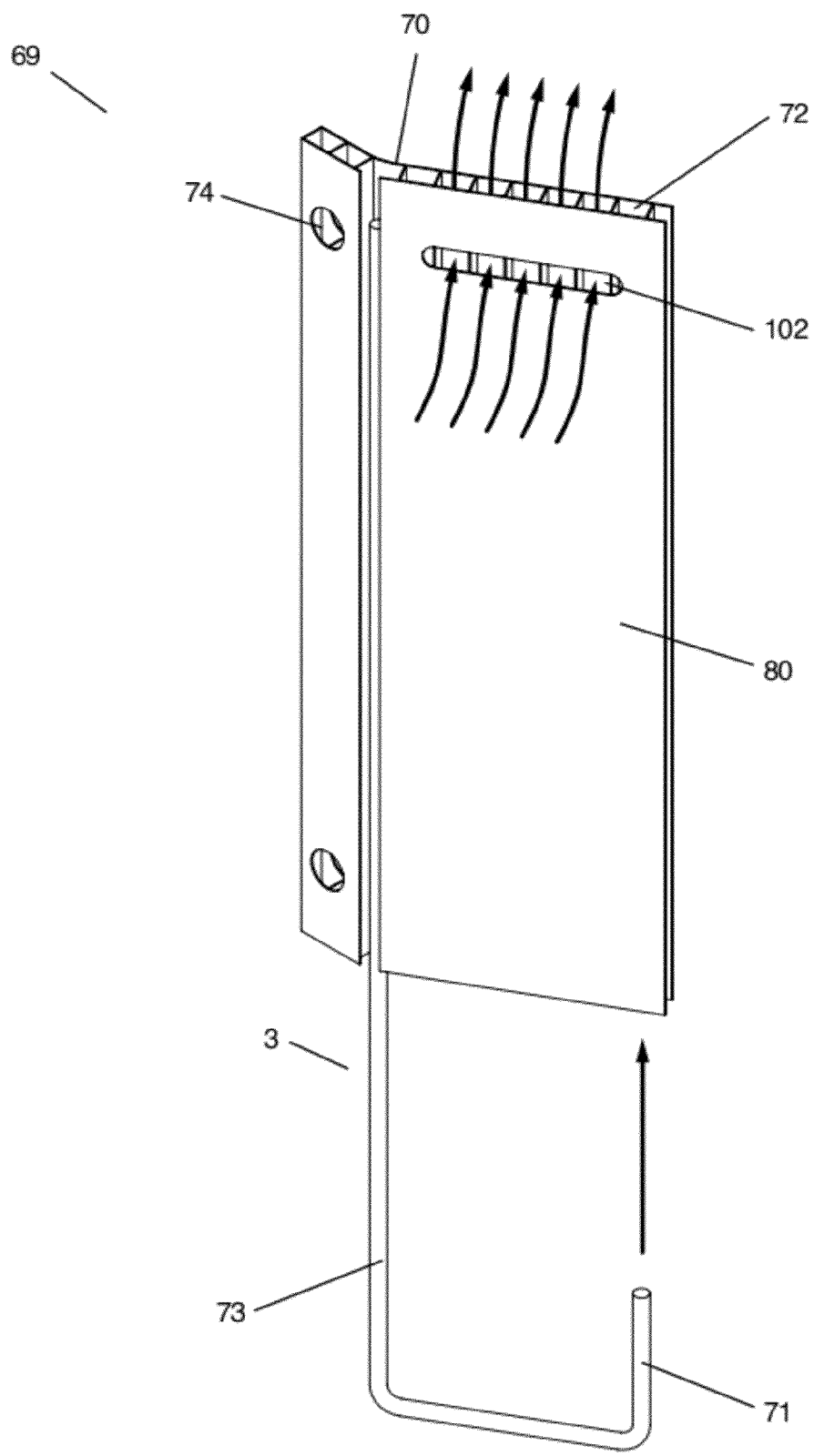
FIG. 11 shows a hinged door and control rod.
Figure 12:
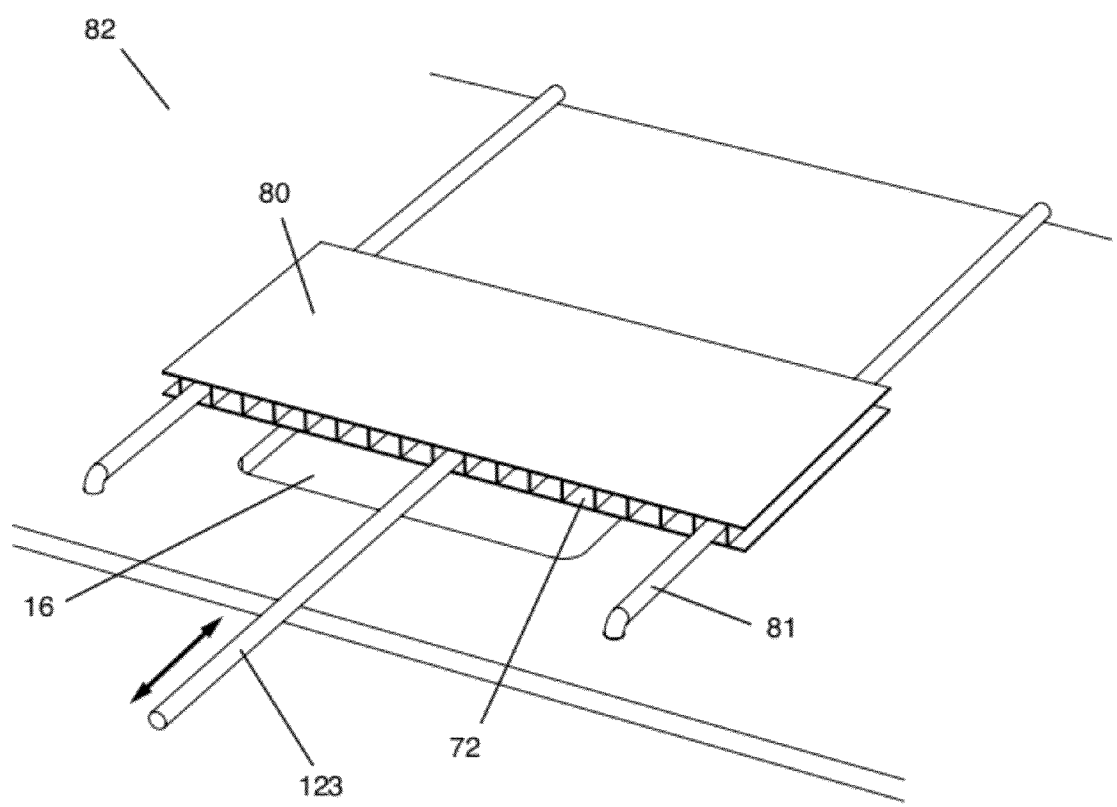
FIG. 12 shows a sliding door, control rod and rails.

FIGS. 11 and 12 show different embodiments for doors 69, 82 that can be used in the model building 1. In preferred embodiments, corrugated plastic sheets 80 are used for fabricating hinged doors 69 or sliding doors 82 in the model building 1. In one preferred embodiment, Coroplast® corrugated plastic sheet (Coroplast, Inc., Dallas, Tex.) may be used. Corrugated plastic sheets facilitate a number of desirable design features including, but not limited to, a living hinge, simple and secure attachment of the rotational or rotatable door control rod 3 and precise door venting. Corrugated plastic sheets are a relatively rigid material, however, slicing through one surface along the length of one of the flutes allows easy flexing along the opposite surface, thereby creating a living hinge. The flutes 72 of the door preferably run vertically. As far as the Applicant knows, corrugated plastic sheets have not been used in doors of model pressure houses.

Each door control rod 3 in the preferred embodiments is made of wire, and gripped by a friction clutch 4, which allows the user to position the door in various positions, including open, closed, or ajar. The friction clutch 4 preferably includes two rubber washers on a bolt. The bolt is fastened to the back wall 13 next to one of the door control rods 3. The rod passes between the two washers such that, as the bolt is tightened, the friction on the door control rod 3 is increased. The rod 3 comes down through the roof 43 and any ceiling 42 or floor 41 panels necessary to reach the door 5, 69. The friction clutch 4 and the rods 3 are preferably fastened onto clamp blocks 39 on the back wall 13, as shown in FIG. 6. The clamp blocks 39 serve several purposes. They move the friction clutch 4 forward of the back wall 13 so the control rod 3 can better align with the door hinge. They also provide an additional surface, separate from the back wall 13, to fasten the friction clutches 4 to, thereby avoiding interference between the friction clutch 4 fasteners and the slides 2 in the back wall 13.

The rotational control rod 3 shown in FIG. 11 should be substantially in line with the hinge 70 of the hinged door 69 to be controlled to avoid unwanted forces on the door components. The rod 3 is preferably formed into a square "J" shape at the bottom with a width that is slightly less than the width of the door 5. The short leg 71 of the J extends up into a flute 72 along the edge of the door 69 furthest from the hinge 70 such that as the control rod 3 is rotated by the user, the door 69 moves. The long leg 73 of the J is collinear with the door hinge 70 and extends above the roof 43 to allow the position of the door 69 to be controlled by the user. The door 69 also includes mounting holes 74 and a door vent 102.

FIG. 12 shows an alternative sliding door structure. Similar to FIG. 11, corrugated plastic sheets 80 with flutes 72 are preferably used as the sliding door 82. The flutes 72 easily accept the sliding control rod 123 and guide rails 81 into the door 123 so that it can slide to reveal a doorway 16. The guide rails 81 are preferably fixed so that the door 82 slides along the guide rails 81 when moved by the control rod 123.

The door 82 to the attic crawl space 83 is also preferably made of corrugated plastic 80 and is an example of the sliding door structure shown in FIG. 12. Two parallel rods 81 mounted to the attic floor serve as guide rails 81. A third rod 123 serves as a sliding control rod projecting through the front wall to allow the user to position the door as needed. In one preferred embodiment, the rods are made of metal. The use of corrugated plastic reduces the need for machining and reduces fabrication costs.

It may be desirable to allow a precise amount of air to flow past a door 69 that seals one room 37 from another. A door vent 102 is shown in door 69 in FIG. 11. Precise venting of the corrugated door 69 can be achieved by cutting a groove or vent 102 of a given width and length through one surface of the material. The side of the door 69 that seals against the doorway 9 when closed is the side the vent 102 is preferably cut on. The air can then flow from one room, into the vent and out the top and bottom of the door flutes 72 (or back in the opposite direction). The number of flutes 72 cut during fabrication and the width of the cut determines the amount of venting allowed.

Figure 13A:
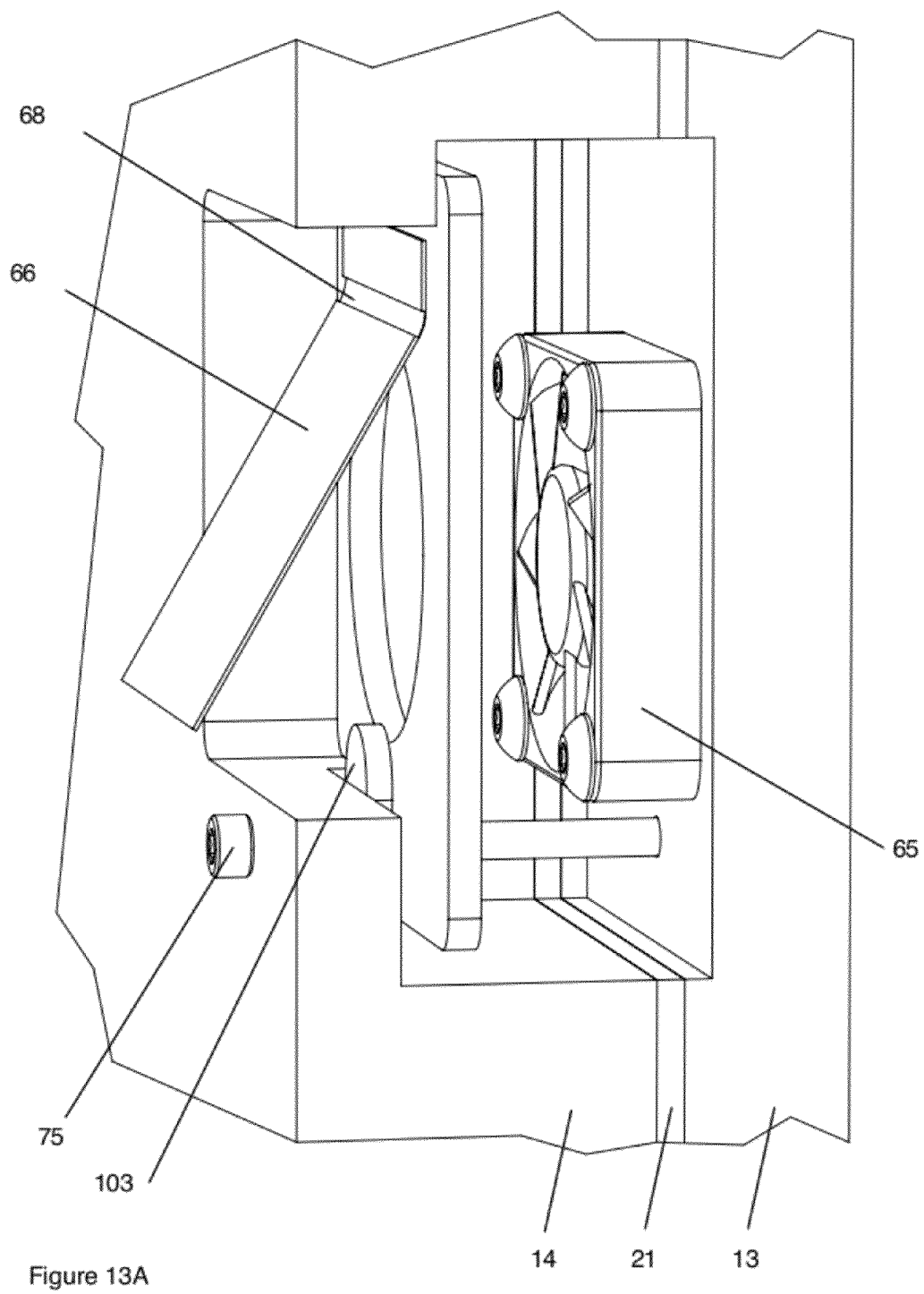
FIG. 13A shows a cutaway view of an exhaust fan check valve with the check valve locked open.
Figure 13B:
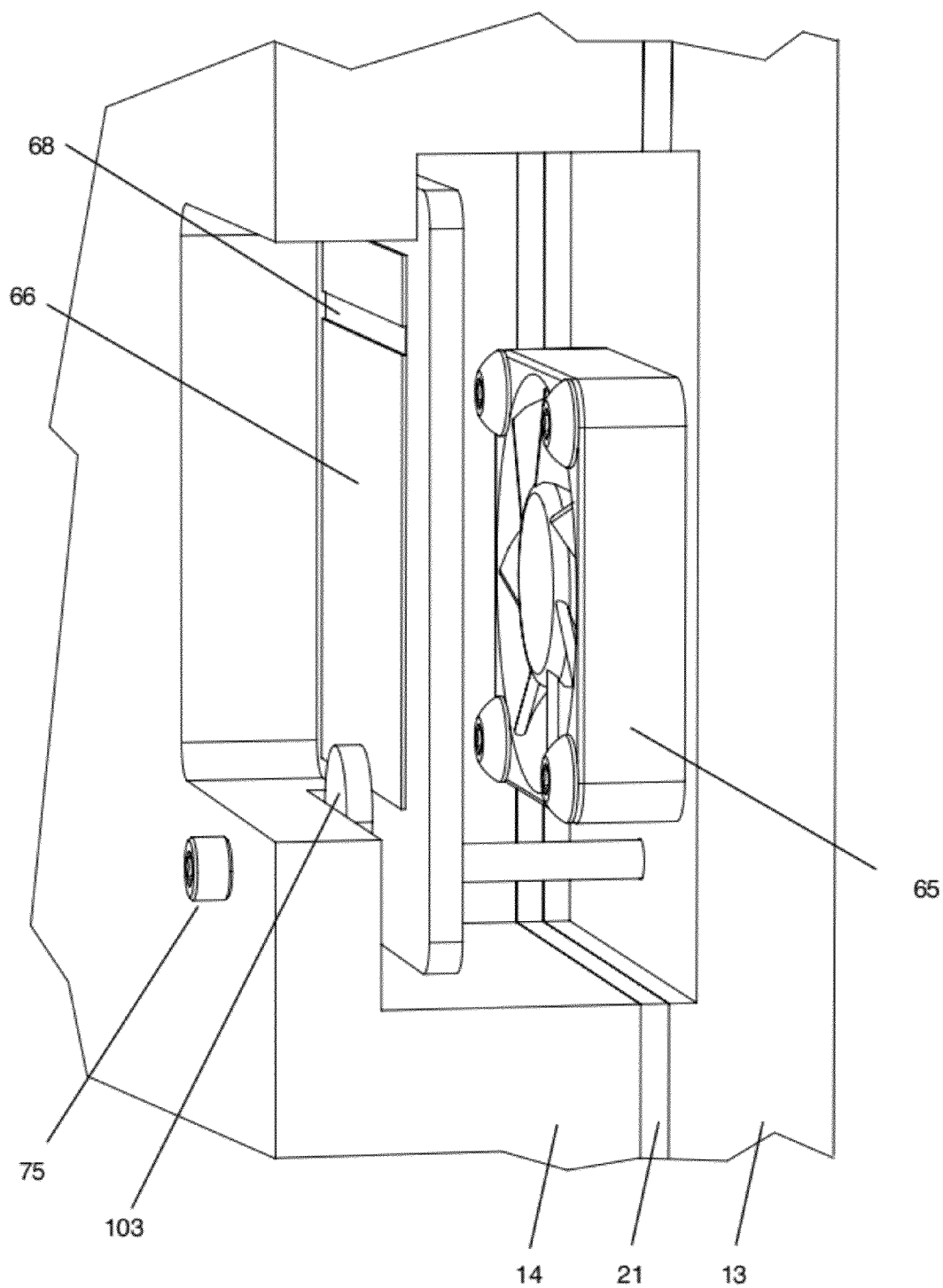
FIG. 13B shows a cutaway view of an exhaust fan check valve with the check valve locked closed.
Figure 13C:
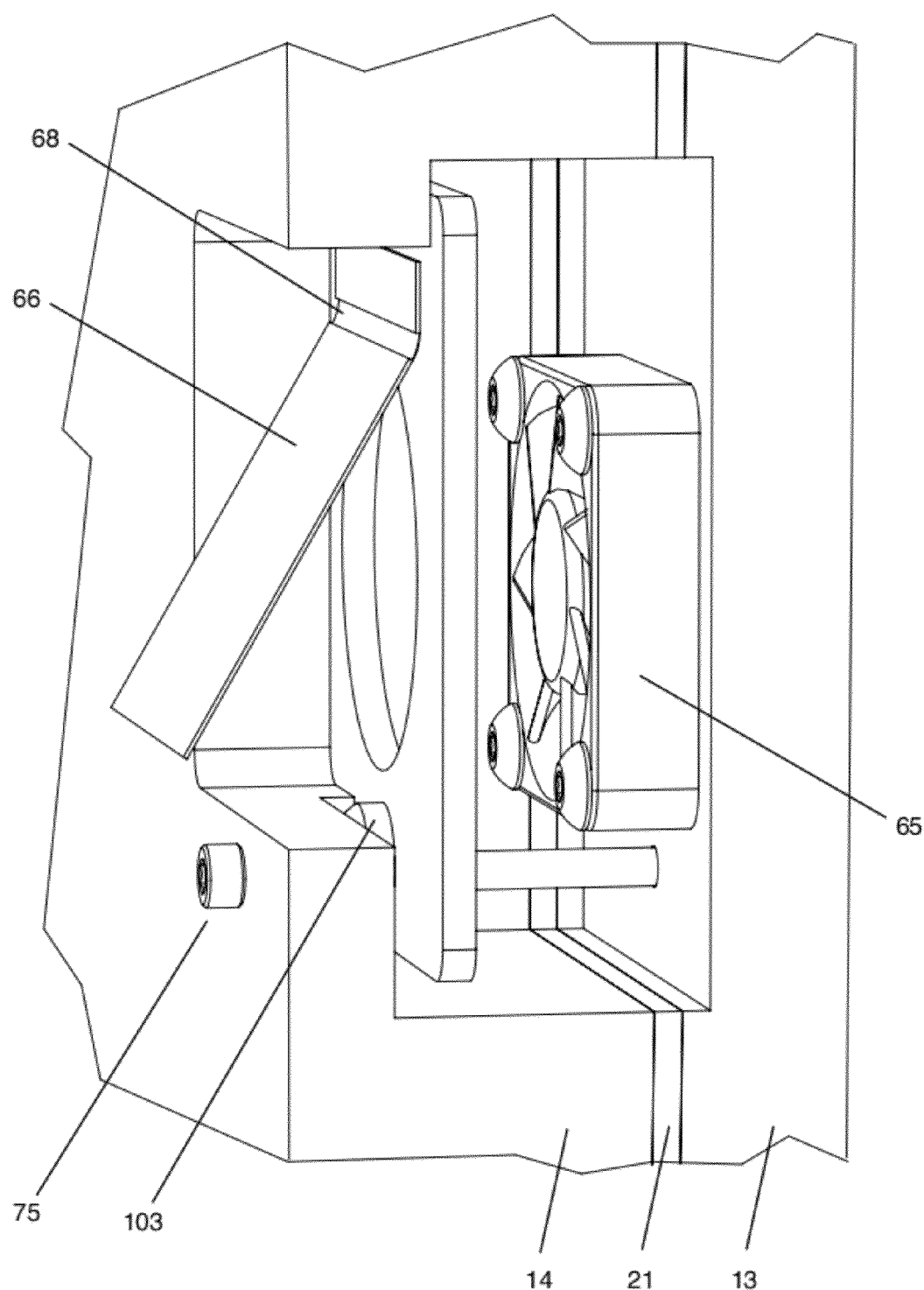
FIG. 13C shows cutaway view of an exhaust fan check valve with the check valve in a normal operating position.

FIGS. 13A through 13C show an exhaust fan 65 with an exhaust fan flap 66. Each exhaust fan valve flap 66 may be locked open (FIG. 13A), locked closed (FIG. 13B), or allowed to move freely to serve as a check valve (FIG. 13C). This represents three possible scenarios in a building structure respectively. The first scenario simulates an exhaust fan 65 with no check valve flap 66 (flap 66 locked open). The second scenario simulates no exhaust fan 65 (flap 66 locked closed). The third scenario simulates a properly working check valve. The valve 66 in the model building is preferably a thin flat rigid material that is attached at the top by some type of hinge that allows it to swing freely. The hinge may include a flexible material 68 such as fabric or plastic membrane. A pivoting latch 103 located near the bottom of the flap 66 can be rotated to hold the flap open, hold the flap closed, or allow the flap to move freely as a check valve. A rotatable control shaft 75 that is securely attached to the latch is also shown. Exhaust fan ports 28 are shown in FIG. 10A.

Figure 14:
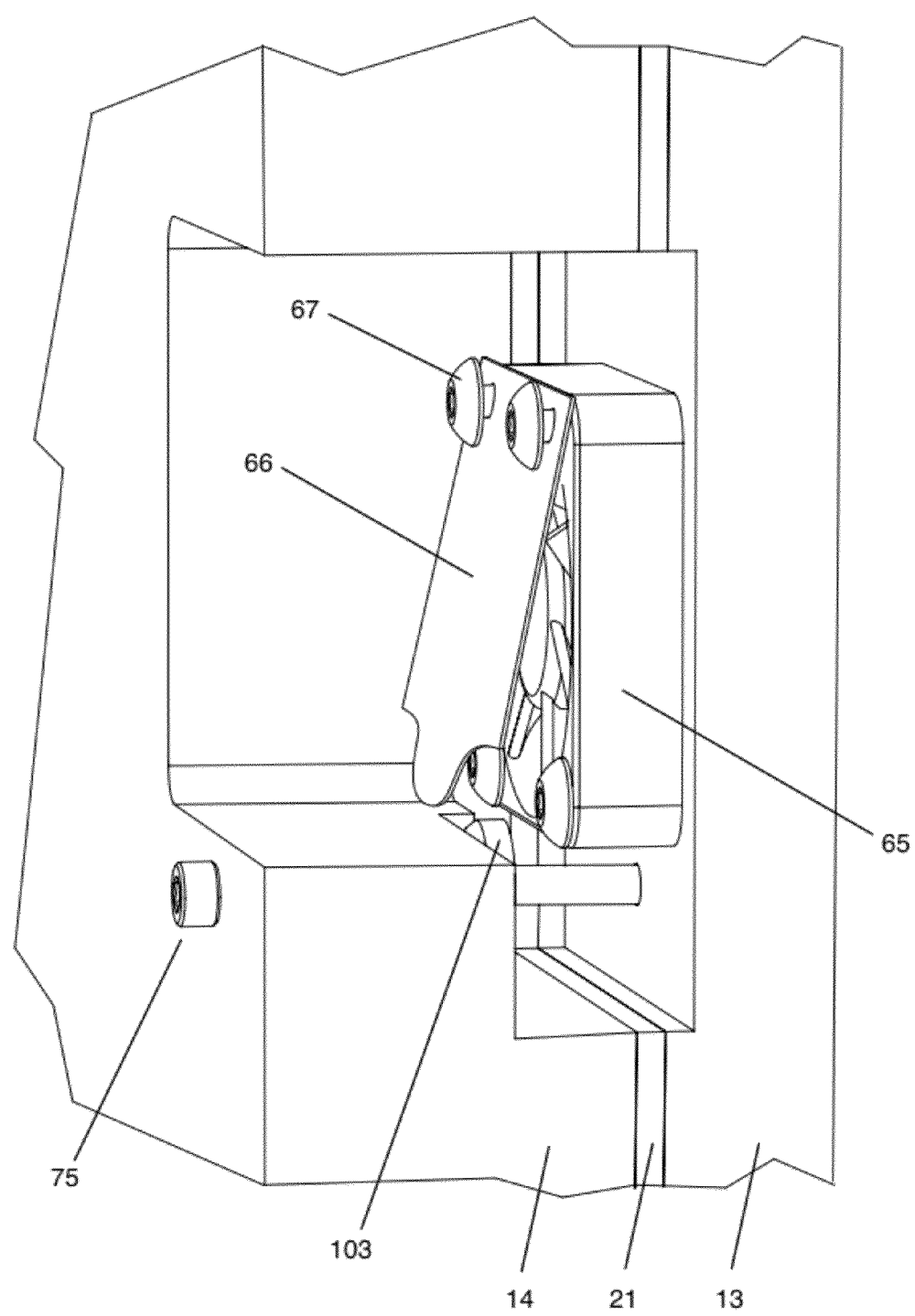
FIG. 14 shows another embodiment of an exhaust fan check valve.

In another embodiment a thin flat rigid material hangs freely from the top two mounting screws of the exhaust fan screws 67, as shown in FIG. 14. Each of the two top screws preferably has a short standoff (preferably less than 0.05" longer than the thickness of the valve flap) between the head of the screw and the fan body. Each standoff has a smaller diameter than the screw head. A hole is preferably located in each of the two upper corners of the valve flap. The holes are slightly larger than the standoffs to allow free movement of the flap 66, but smaller than screw heads to ensure it is held in place. A pivoting latch 103 located near the bottom of the flap 66 can be rotated by means of control shaft 75 to hold the flap open, hold the flap closed, or allow the flap to move freely as a check valve.

Air handler 93 airflow from the center of the return plenum 29 to the perimeter of the supply plenum 64 allows return 32 and supply air ducts 31 to be laid out in a planar configuration in the back wall 13 without the need for crossovers. In a preferred embodiment, air is pulled from the center of the return air plenum 29, located behind the back wall 13, forward through the fan 25 and into the supply air plenum 64, located in front of the back wall 13. An air handler fan port 30 is shown in FIG. 10B. The supply air flows back into the supply ducts 31 in the back wall 13 as shown by the arrows 76 in FIG. 10B. The return air flows from the return ducts 32 back into the fan 25. In nearly all circumstances, this configuration allows the supply 31 and return 32 air ducts for each room to run parallel to each other without crossover.

If the model 1 is configured so the air handler fan 25 is rotated 90 such that the air in the air handler moved laterally, from left to right for example, within an enclosing cover that serves as a return plenum on the left and a supply cover on the right, supply ducts 31 would run from supply ports on the right side of the air handler 93 and return ducts 32 would run to supply ports on the left. Numerous crossovers with additional components would be required in routing supply 31 and return 32 ducts to each room 37, adding significantly to the cost for design and manufacture.

The blower door 15 in the model building 1 simulates an actual blower door. Similar to actual blower doors, this model preferably uses a Venturi type pressure measurement system on the intake side of the blower door 15 to calculate air velocity and subsequently determine volume of airflow. Volume of airflow in turn allows calculations to determine the airtightness of the building. However, a relatively airtight building will restrict airspeed to the point that it is difficult to get an accurate pressure reading at the Venturi. Actual blower doors typically have some means of restricting airflow to compensate for this. While the volume of airflow remains relatively constant when restricted, the resulting increase in airspeed near the Venturi allows for more accurate pressure readings. Manometers typically used in performing zonal pressure diagnostics on actual buildings compensate for the restricted airflow and increased airspeed when calculating the volume of airflow (measured in cubic feet per minute). The manometers work the same on the model blower door of this invention as they do in the real-world setting.

Figure 15:
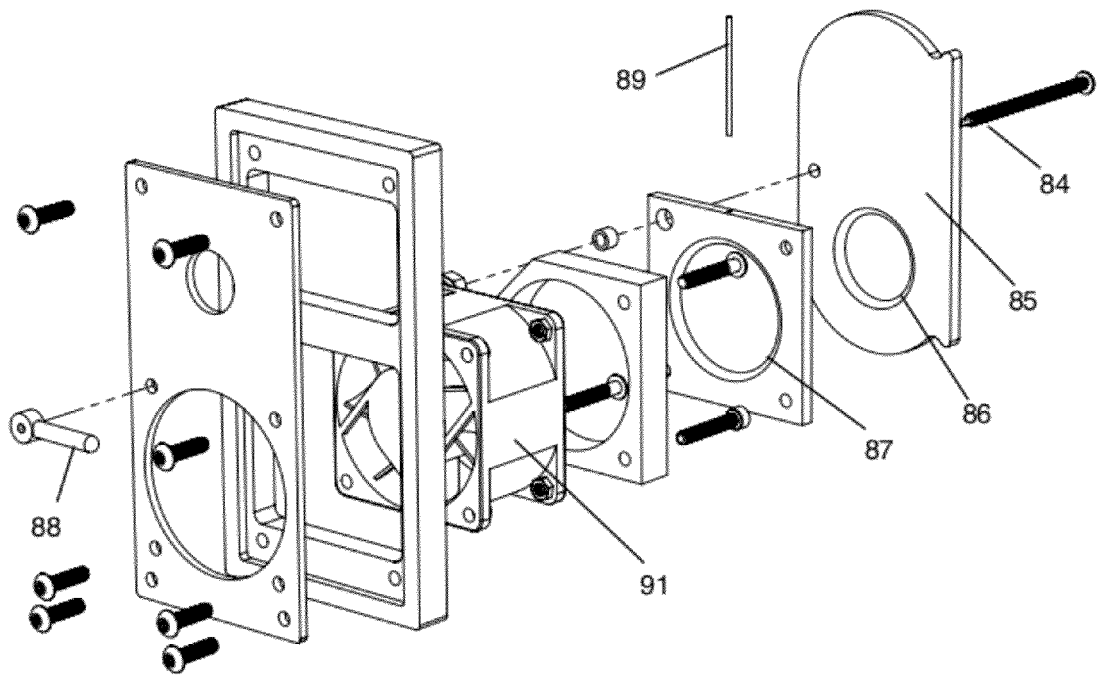
FIG. 15A shows an exploded front view of a blower door in an embodiment of the present invention.
FIG. 15B shows a back view of the blower door in a closed position.
FIG. 15C shows a back view of the blower door in an open position.
FIG. 15D shows a back view of the blower door in an A-ring position.
Figures 15B, 15C, 15D:
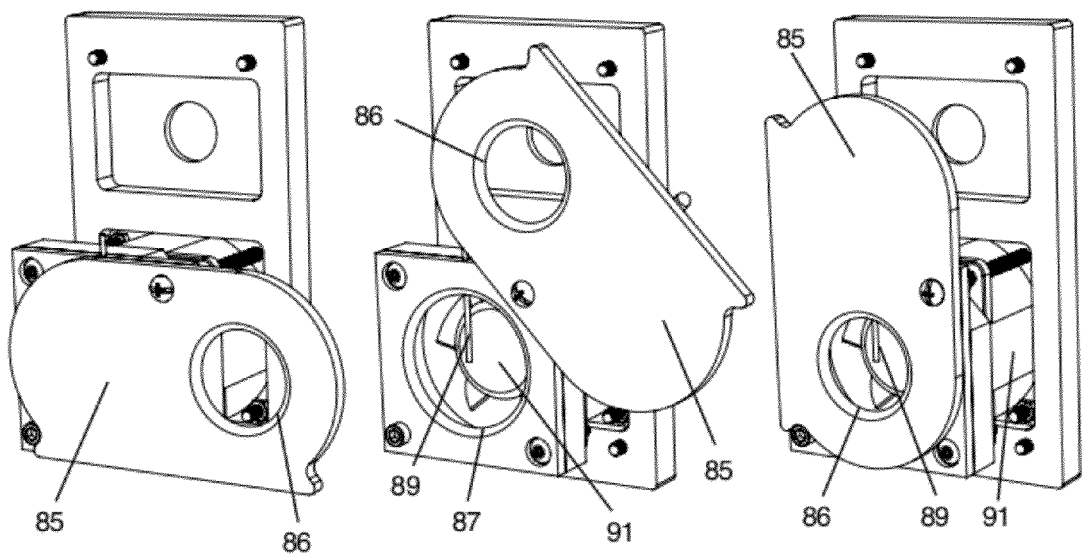

In a preferred embodiment, as shown in FIGS. 15A through 15D, the model configuration simulates three flow settings of an actual blower door 15: open (FIG. 15C), A-ring (FIG. 15D), and closed (FIG. 15B). Three settings allow the model to more closely replicate circumstances of real-world scenarios. The blower door 15 includes a fan 91 mounted in an open area of the door for blowing air through an air port 87 through the door 15. Fasteners 84 hold the blower door 15 components together.

The three settings of the blower door are accomplished by moving an airflow control plate 85 movably mounted adjacent to the air port of the fan. In one preferred example the plate 85 is an obround control plate having a hole 86 at one end which is of smaller area than the air port 87, restricting air flow. The control plate 85 is movable between an "A-ring" position where the hole 86 is aligned with the air port 87, allowing limited air flow through the port 87, a "closed" position in which the opposite end of the plate 85, with no hole, seals off the air port 87, blocking air flow through the port, and an "Open" setting, when the control plate 85 is moved completely out of the way of the air port 87. This could be accomplished by pivoting the control plate 85 as shown in the FIGS. 15A-15D, or by slideably moving the plate 85 across the port 87, or in other ways known to the art.

External control of the airflow control plate 85 is provided by a knob 88 (at the front of the blower door 15) that is securely attached to rotatable shaft 92 that is securely attached to airflow control plate 85, thereby allowing rotation of the airflow control plate 85 to one of three positions. The blower door 15 settings can be changed quickly as required by various airflow scenarios.

In other embodiments, additional settings may be added to the airflow control plate 85, or additional plates may be added to better simulate actual blower doors, which may have an "Open" setting as well as airflow restrictor rings "A" through "E". Alternatively, the hole in the airflow control plate could be made of variable size.

Figure 18A:
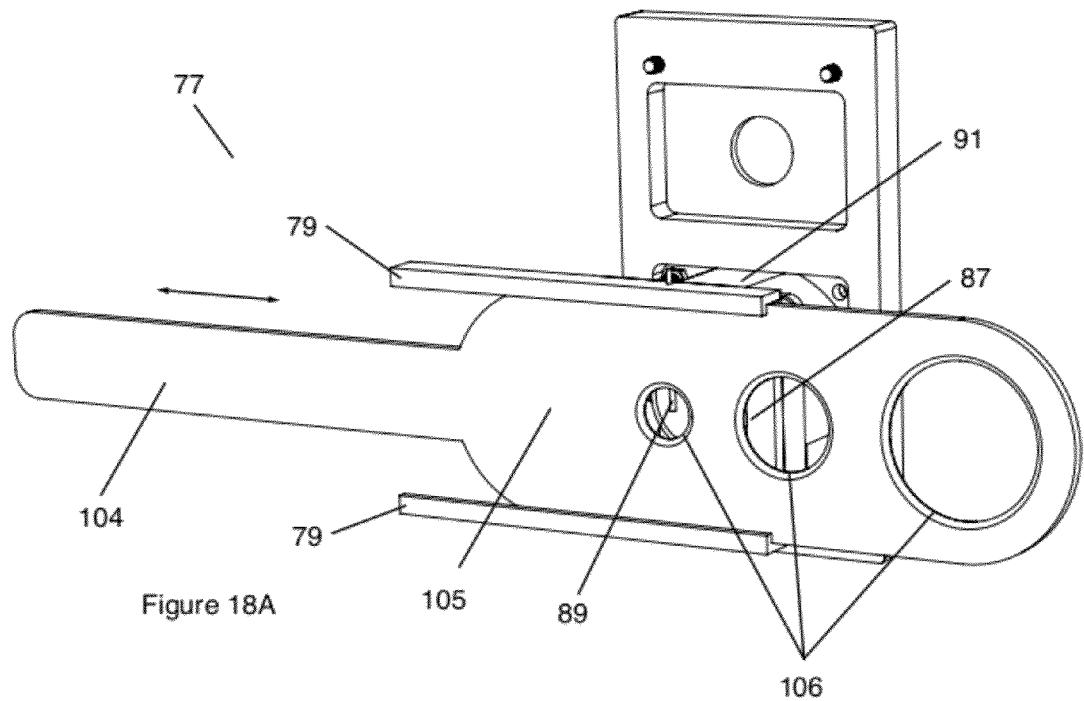
FIG. 18A shows a blower door having a sliding plate with holes.

FIG. 18A shows a restrictor hole slide plate 77 as another embodiment of control plate 85. This embodiment shows restrictor rings "A" through "C". Handle 104 protrudes through the sidewall of the model allowing the user to position any one of the restrictor holes 106 in the airflow of the fan 91, or moved completely out of the way to expose the Open Ring 87.

Figure 18B:
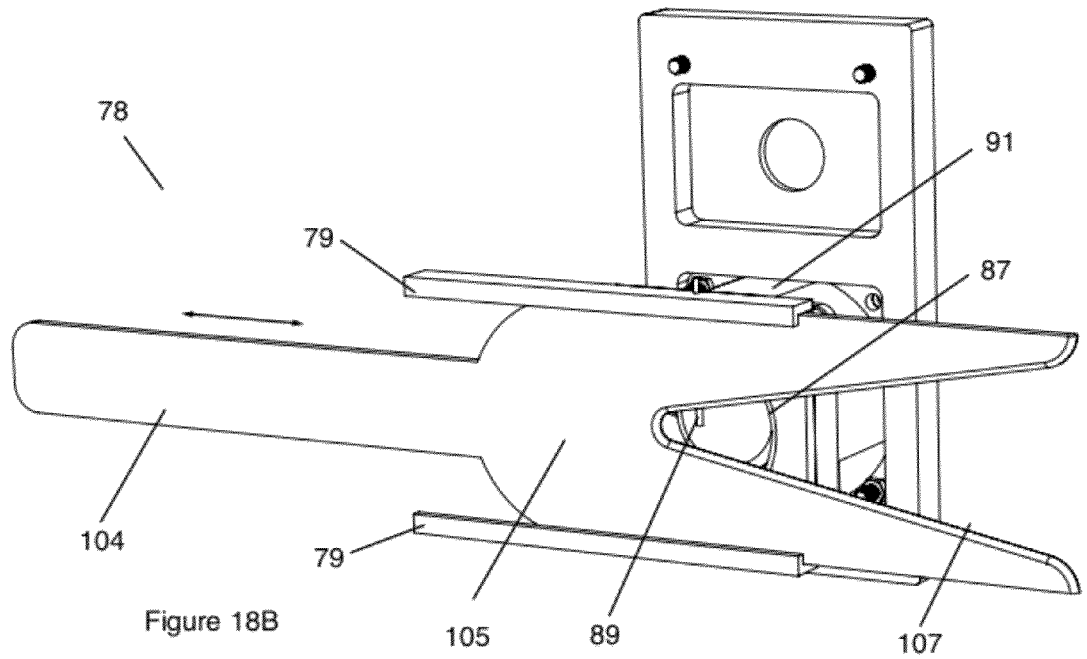
FIG. 18B shows a blower door having a sliding plate with a variable-size slot.

FIG. 18B shows restrictor slot slide plate 78 in yet another embodiment of control plate 85. Unlike the restrictor hole slide plate, the restrictor slot slide plate does not need to move discrete increments for each setting. This allows more precise adjustment of restrictor settings and reduces the distance the slide plate needs to travel for a given range of settings. The reduced distance allows for a more compact design.

A relatively small rigid tube 89 is preferably positioned radially in the opening 87 of the "Open ring". The open end of the tube is in the center of the blower door and serves as the Venturi port. The other end is attached to a manometer 20 by a flexible tube 90 to provide pressure readings (see FIG. 6). Airspeed is greatest at the center of a restricted section of airflow. By placing the end of the Venturi tube 89 at the center of the blower door opening, laminar airflow across the Venturi 89 is ensured regardless of any restriction of airflow by restrictor rings.

The model building 1 also preferably includes an airflow indicator (AFI) 7. Back-to-back thermistors in a Wheatstone bridge are preferably used to sense airflow in the model building 1. While this is a well-known method of accurately measuring speed and direction of airflow, to the Applicant's knowledge, this is the first time such a device has been used on a pressure house used for teaching zonal pressure diagnostics. Light bulb filaments may be used in place of the back-to-back thermistors to detect airflow with greater sensitivity. The back-to-back thermistors in the Wheatstone Bridge are preferably coupled with an LED sequencer to display rate and direction of airflow in chimneys, ducts, interstitial cavities or rooms in the form of sequential illumination of a plurality of lights (preferably light-emitting-diodes (LEDs)), such that air flow speed and direction are indicated by the motion of a "chasing" light display.

The Air Flow Indicator (AFI) circuit is designed to display the rate and direction of airflow between two areas of different pressures. For example, the AFI could be mounted in the chimney such that it provides a visual representation of the speed and direction of the airflow in the chimney. This is useful in a training environment for identifying conditions that can cause a dangerous chimney back draft.

Figure 19:
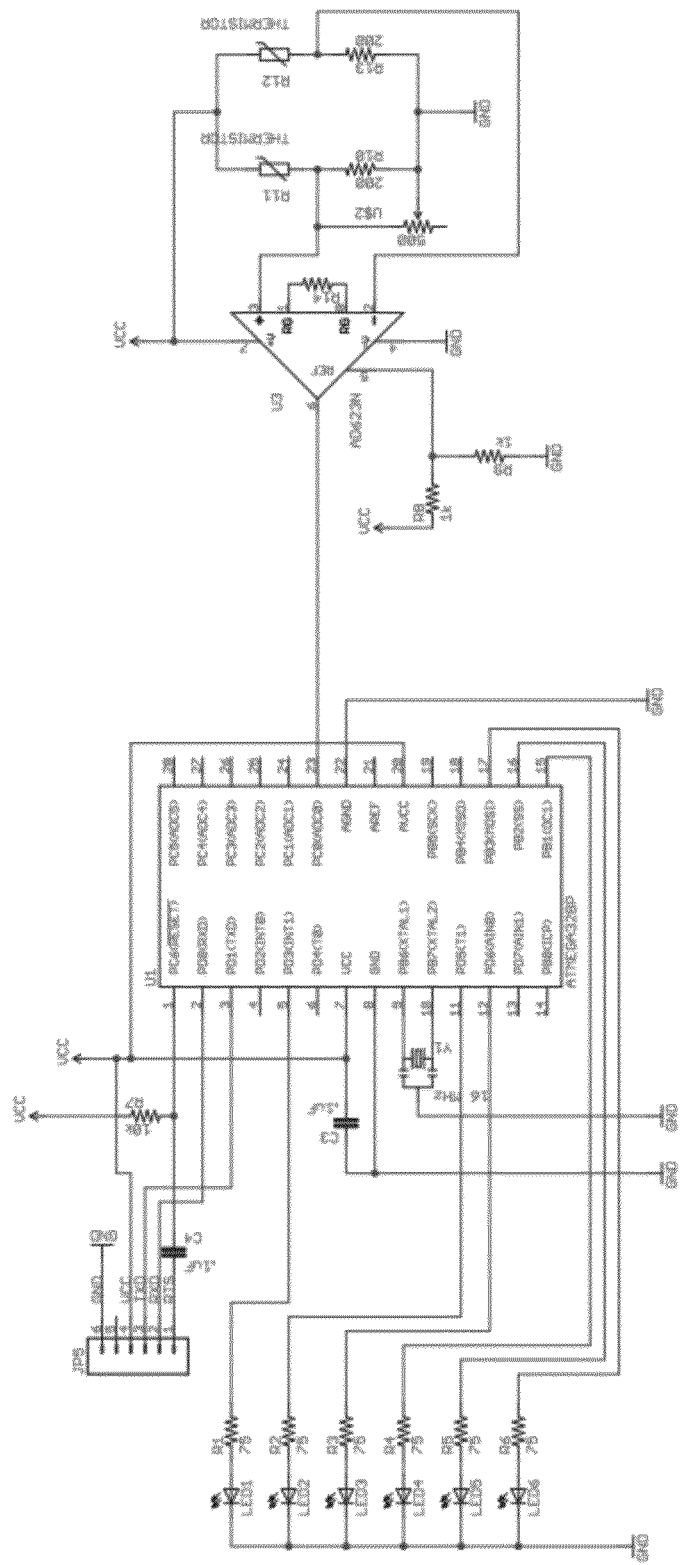
FIG. 19 shows a schematic of an airflow indicator.
Figure 20:
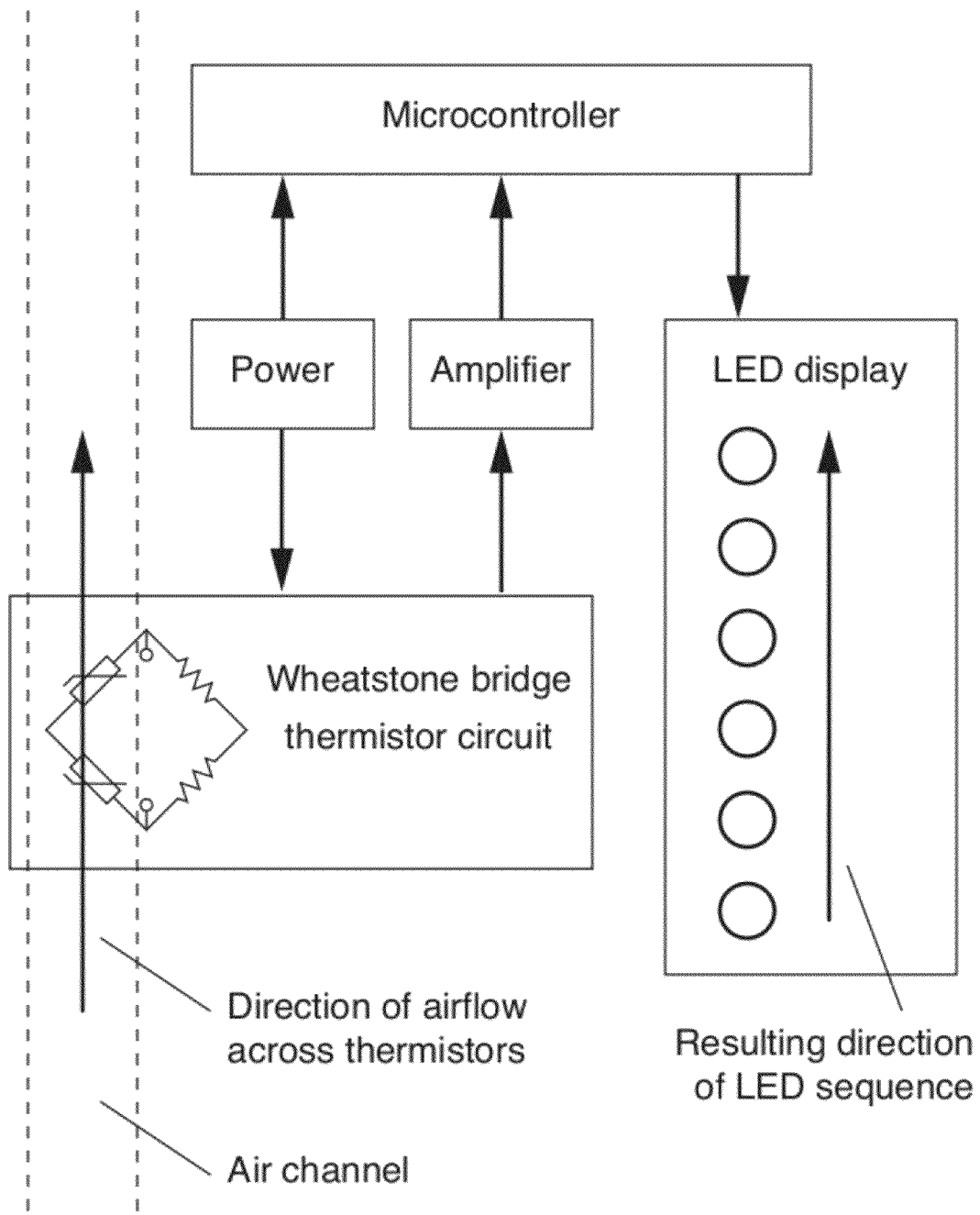
FIG. 20 shows a circuit block diagram of the airflow indicator in use in a model house.
Figure 21:
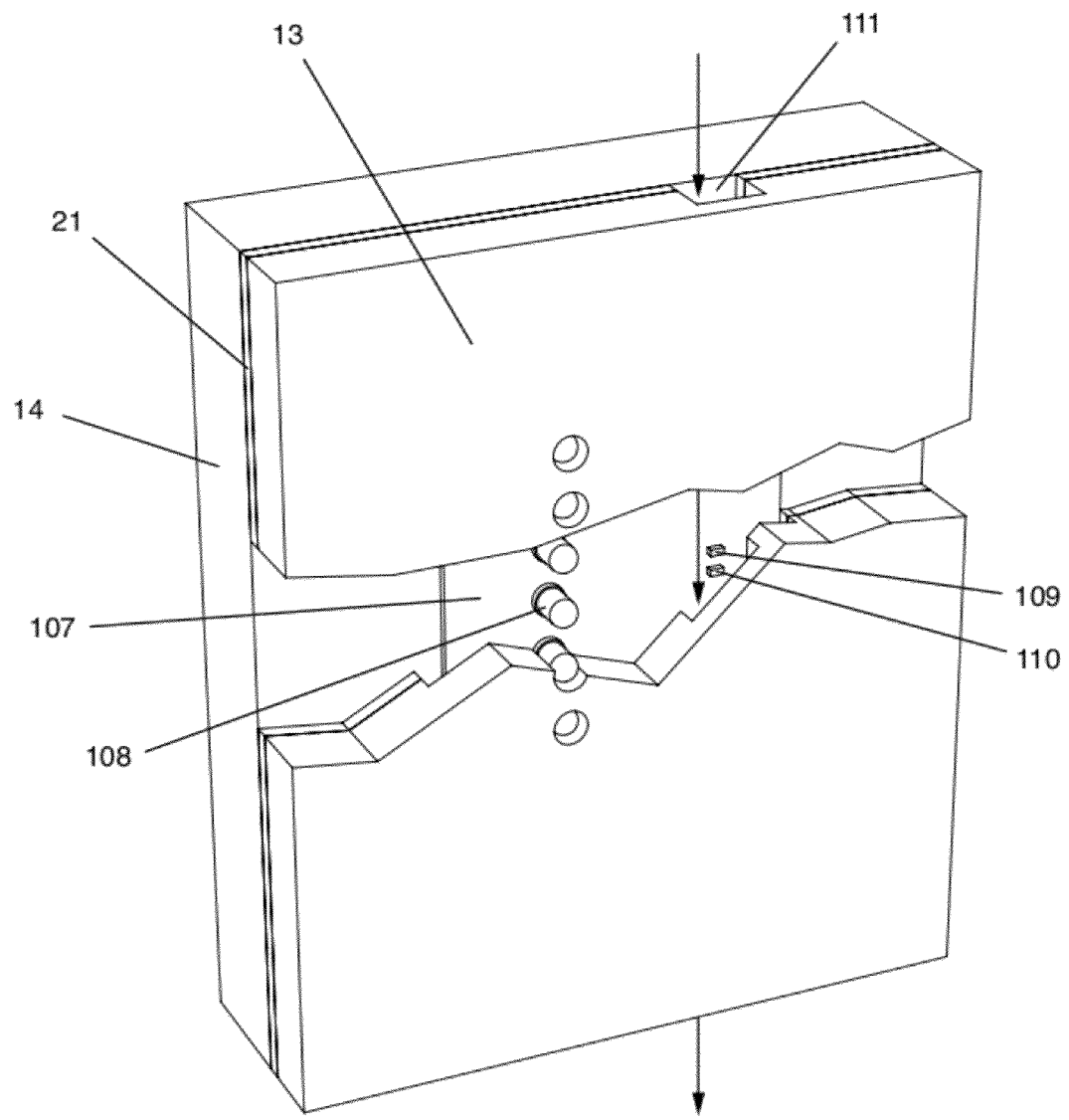
FIG. 21 shows a partial cut-away view of the airflow indicator.

FIG. 19 shows a typical Wheatstone bridge coupled with an LED array. FIG. 20 shows a block diagram of the circuit and the LED array's relationship to the path of the airflow across the thermistors, and FIG. 21 shows a partially cut-away view of an AFI corresponding to the block diagram in FIG. 20. FIG. 20 shows the chasing light display simulating the upward moving airflow in the air channel, while the air flow in FIG. 21 is the opposite direction.

The AFI circuit works by utilizing a circuit comprised of two thermistors R11 and R12 combined with two fixed resistors R10 and R13 in an arrangement known as a Wheatstone bridge. A first leg of the bridge is formed by a series arrangement of resistor R10 coupled to thermistor R11 at a junction point, and a second leg is formed by a series arrangement of resistor R13 coupled to thermistor R12 at another junction point. One end of each leg of the bridge is attached to a voltage source $V_{cc}$, and the other end of each leg of the bridge is grounded. The resistance values of resistors R10 and R13 are the same, and the values of thermistors R11 and R12 are the same when the thermistors are not affected my moving air. Thus, the voltage at the R11-R10 junction of the first leg is normally equal to the voltage at the R12-R13 junction of the second leg, and the relative voltage between the junctions is thus balanced at zero volts. Any change in the resistance of thermistor R11 relative to thermistor R12 will result in an imbalance between the legs of the bridge, causing a voltage difference between the junction points.

The thermistors are preferably physically oriented between two areas such that when the air pressure within a first area is lower than the air pressure in a second area, air flowing from the second area into the first area is cooling the first thermistor R11 in the bridge more than the second thermistor R12, which is shielded by the first thermistor R11, thus leading to a voltage imbalance in the bridge, which, as explained above, is registered as a measurable positive voltage difference between the junction points of each leg of the Wheatstone bridge circuit. For air that is moving faster across the thermistors there is a greater potential difference across the midpoints of the bridge, and if the air is flowing in the opposite direction, the polarity of the voltage difference is reversed.

The junctions are coupled to differential inputs to amplifier U3, which amplifies the difference and feeds it into a microcontroller U1. Microcontroller U1 interprets the magnitude of the voltage level and then pulses an array of lights LED1-LED6 in a chasing sequence that gives the illusion of downward movement in the direction of the air flow. As the magnitude of the voltage difference increases, the microcontroller U1 pulses the array of lights LED1-LED6, causing the sequence to appear to move faster, giving a visual indication of air speed.

When the air pressure in the first area is greater than the pressure in the second area, air flowing from the first area to the second area initiates the same process but in reverse order, cooling the second thermistor R12 and shielding the first R11 resulting in a negative voltage being sent to the amplifier U3. The microprocessor U1 reads the voltage from the amplifier U3 and reverses the light sequencing of the array LED1-LED6 creating an apparent upward movement of the chasing LED to indicate the airflow.

If, for example, an AFI 13 as shown in FIG. 21 is mounted in a chimney 111 in a model building, air flow as shown by the arrows represents a chimney back draft situation in which smoke in the chimney 111 can be drawn down into the living quarters of a house. In this situation, the air flows first past first thermistor 109, then past thermistor 110, which is arranged to be partially shielded by the first thermistor 109. As explained above, this means that thermistor 109 is cooled more by the airflow than thermistor 110, causing an imbalance between the two legs of the Wheatstone bridge. The circuitry mounted on the printed circuit board 107 will then, through the process described above, cause the lights in the LED array 108 to flash in a sequence showing downward movement of the air in the channel 111. If the airflow reverses, the direction of the chasing light display reverses as well.

As mentioned earlier, the AFI in one embodiment is used to indicate the speed and direction of air in a chimney, but a pressure house can be designed with an AFI built between any two zones in the model to indicate pressure differences and the resulting airflow between them.

It will be understood that as used herein, the term "thermistor" is meant to encompass resistive elements in which a resistance value of the resistive element changes as a temperature of the element changes. For example, a light bulb filament or other resistive wire element could be used as a thermistor in the Wheatstone bridge of the AFI within the meaning of the term.

In preferred embodiments, feet 19 are attached to the model building to prevent it from tipping since it is so thin. The feet 19 are shown in FIGS. 6, 7A and 7B. In one embodiment, a pair of feet 19 are attached to a structural component 18, such as a gusset, that in turn is fastened by a hinge 63 to the back of the model. Although two feet 19 are shown in the figures, additional feet could be used to increase stability. Alternatively, a single foot could be used. The feet 19 preferably fold out of the way under the model building 1 for transport. They preferably pivot to provide a stable base. In one preferred embodiment, the feet 19 pivot roughly 90° to create a stable base. They remain attached during use and transport. Because the feet 19 fold under the model, the model may be hung on a wall without removing the feet. This is desirable in some classroom situations.

It will be understood that the term "model building" used in this description is intended to encompass both reduced-scale models and human-scale models.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A model pressure building for pressure diagnostics simulation or weatherization simulation, comprising
    a front capture layer;
    a room layer sealed to the front capture layer comprising a plurality of spaces enclosed by layer panels; and
    a back capture layer sealed to an opposite side of the room layer from the front capture layer;
    such that air movement to or from the pressure building or between spaces within the building simulates pressure conditions of an actual building.

2. The model building of claim 1, wherein a ratio of a width of the model building to a depth of the model building is greater than 5:1.

3. The model pressure building of claim 1, wherein a ratio of a width of the model building to a depth of the model building is greater than 8:1.

4. The model pressure building of claim 1, further comprising a back panel layer, located on a side of the back capture layer opposite the room layer.

5. The model pressure building of claim 4, further comprising a plurality of slides contained by grooves and captured between the back capture layer and the back panel layer.

6. The model pressure building of claim 5, further comprising a leaf spring behind at least one slide, forming a compressible arch pressing against the slide.

7. The model pressure building of claim 1, wherein the front capture layer and the back capture layer each have a plurality of recesses to capture layer panels of the room layer, the layer panels running from the front capture layer to the back capture layer and being sealed to both the front capture layer and the back capture layer.

8. The model pressure building of claim 1, wherein the layer panels of the room layer are arranged to create a plurality of rooms with interstitial cavities between rooms.

9. The model pressure building of claim 8, further comprising at least one bypass valve within the interstitial cavities, having an open position, a closed position and at least one position between the open position and the closed position, to simulate leaking and sealed interstices.

10. The model pressure building of claim 9, wherein the bypass valve is a butterfly valve having a rotatable positioning shaft and a flexible sealing component fitted on the rotatable positioning shaft.

11. The model pressure building of claim 10, wherein the butterfly valve is selected from the group consisting of a full butterfly valve and a half butterfly valve.

12. The model pressure building of claim 10, wherein the flexible sealing component comprises a flexible and floating sealing component.

13. The model pressure building of claim 9, wherein the valve comprises 50% or less of a depth of the interstitial cavity.

14. The model pressure building of claim 9, wherein the valve comprises 50% or more of a depth of the interstitial cavity.

15. The model pressure building of claim 9, wherein the bypass valve is a flap valve.

16. The model pressure building of claim 8, in which the rooms are box structures.

17. The model pressure building of claim 1, wherein at least one of the layer panels further comprises a hinged door.

18. The model pressure building of claim 17, wherein the hinged door comprises a panel of corrugated material having a first outer layer, a corrugated layer comprising a plurality of flutes, and a second outer layer, the panel comprising a door section and a mounting section separated by a living hinge formed by cutting through one of the first outer layer or the second outer layer along a flute, the door section and the mounting section being hingedly attached by the other of the first outer layer or the second outer layer which is not cut.

19. The model pressure building of claim 18, wherein the hinged door further comprises a control rod having a J-shape, wherein a short leg of the J fits into a first flute of the corrugated layer of the door section, and a long leg of the J fits into a second flute at the living hinge of the hinged door, such that the long leg of the J extends through the room layer and can be rotationally controlled from outside the room layer.

20. The model pressure building of claim 19, further comprising a friction clutch coupled to the control rod, for frictionally restraining movement of the control rod to allow positioning the door in a range of positions from fully open to fully closed.

21. The model pressure building of claim 17, wherein at least one of the layer panels comprises a sliding door comprising at least one first rod placed within a flute of the corrugated material to move the door and at least two second rods each placed within a flute of the corrugated material to form guide rails.

22. The model pressure building of claim 1, in which at least one of the layer panels comprises at least one door having at least one door vent for allowing a determined amount of air to flow past the door.

23. The model pressure building of claim 1, wherein the back capture layer comprises a plurality of air ducts communicating with a plurality of rooms in the room layer through room vents.

24. The model pressure building of claim 23, in which the plurality of air ducts are formed as channels cut into a rear surface of the back capture layer closed by a back panel sealed to the rear surface of the back capture layer.

25. The model pressure building of claim 24, wherein the channels are made by a method selected from the group consisting of: machining with computer numerically controlled machining; cutting manually; and a combination of machining with computer numerically controlled machining and cutting manually.

26. The model pressure building of claim 23, wherein the air ducts comprise a plurality of supply ducts and a plurality of return ducts distributed in a radial layout around a supply plenum and a return plenum such that there is no crossover between the supply ducts and the return ducts.

27. The model pressure building of claim 23, further comprising a plurality of shutoff slides in the plurality of air ducts, for controlling flow of air through the room vents.

28. The model pressure building of claim 1, wherein the room layer is one room in depth.

29. The model pressure building of claim 1, wherein the room layer is more than one room in depth, comprising a plurality of layers of rooms separated by, and sealed to, a dividing wall between each layer of rooms.

30. The model pressure building of claim 1, further comprising at least one airflow indicator for measuring and indicating at least one of airspeed, air direction, and pressure differential between areas.

31. The model pressure building of claim 30, in which the airflow indicator indicates speed and direction of airflow through sequential illumination of a plurality of lights.

32. The model pressure building of claim 30, in which the building further comprises a chimney and at least one airflow indicator for indicating air flow in the chimney.

33. The model pressure building of claim 30, in which the airflow indicator senses air flow using an airflow sensor comprising a Wheatstone bridge, comprising:
    a first leg and a second leg, each leg comprising a series arrangement of a thermistor having a resistance value and a resistor having a resistance value, the resistance values of the resistors being the same, and the resistance values of the thermistors being the same when the thermistors are not exposed to air flow;
    a first end of each thermistor being connected to a power source,
    a first end of each resistor being connected to ground,
    a second end of each thermistor being connected at a junction point to a second end of one of the resistors,
    such that a voltage between the junction point of the first leg and the junction point of the second leg indicates an out of balance condition between the legs in the Wheatstone bridge;
    the thermistors being arranged such that when the thermistors of the airflow sensor are located in a stream of air moving in a first direction, the thermistor of the first leg is at least partially shielded from airflow by the thermistor of the second leg, and when the stream of air is moving in a second direction opposite to the first direction, the thermistor of the second leg is at least partially shielded from airflow by the thermistor of the first leg, such that when the thermistors are exposed to air flow, the resistance value of the thermistor which is partially shielded from air flow is different from the thermistor which is not shielded from air flow, causing an imbalance between the legs of the Wheatstone bridge.

34. The model pressure building of claim 1, further comprising a fan coupled to the room layer for causing air flow into or out of the building.

35. The model pressure building of claim 1, further comprising a blower door comprising:
    a door;
    a fan mounted in the door for causing air flow from one side of the door to the opposite side of the door through an air port having an area for air flow; and
    an airflow control plate comprising body having a solid portion and at least one hole having an area smaller than the area of the air port,
    wherein the airflow control plate is mounted adjacent the air port, movable between at least a position in which the solid portion of the plate covers the air port, blocking air flow, a position where at least one hole is aligned with the port, allowing limited air flow, and a position where the plate is out of the way of the port, allowing full air flow.

36. The model pressure building of claim 35, in which the airflow control plate is obround in shape and is pivotally mounted for movement relative to the air port.

37. The model pressure building of claim 35, in which the airflow control plate is mounted for linear sliding movement relative to the air port.

38. The model pressure building of claim 35, in which the airflow control plate has five holes of graduated size, and the airflow control plate is movable to positions in which each of the five holes is aligned with the air port.

39. The model pressure building of claim 35, in which the hole in the airflow control plate is of variable size.

40. The model pressure building of claim 35, in which the door further comprises a Venturi tube centrally positioned in the air port and coupled to a pressure sensor, for measuring air flow through the air port.

41. A wall for a model pressure building having a plurality of rooms, comprising:
    a planar body having a plurality of channels cut into a rear surface of the body;
    a plurality of room vents through a front surface of the body, communicating with the plurality of channels, located so as to convey air between the plurality of channels and the plurality of rooms; and
    a back panel sealed to a rear surface of the wall, closing off the channels to form air ducts.

42. The wall of claim 41, wherein the channels are made by a method selected from the group consisting of: machining with computer numerically controlled machining; cutting manually; and a combination of machining with computer numerically controlled machining and cutting manually.

43. The wall of claim 41, wherein the air ducts comprise a plurality of supply ducts and a plurality of return ducts distributed in a radial layout around a supply plenum and a return plenum such that there is no crossover between the supply ducts and the return ducts.

44. The wall of claim 41, further comprising a plurality of shutoff slides in the plurality of air ducts, for controlling flow of air through the room vents.

45. The model pressure building of claim 1, further comprising at least one airflow indicator for measuring and indicating at least one of airspeed, air direction, and pressure differential between areas of the model pressure building comprising:
    a) an airflow sensor comprising a Wheatstone bridge, comprising:

a first leg and a second leg, each leg comprising a series arrangement of a thermistor having a resistance value and a resistor having a resistance value, the resistance values of the resistors being the same, and the resistance values of the thermistors being the same when the thermistors are not exposed to air flow;

a first end of each thermistor being connected to a power source, a first end of each resistor being connected to ground, a second end of each thermistor being connected at a junction point to a second end of one of the resistors, such that a voltage between the junction point of the first leg and the junction point of the second leg indicates an out of balance condition between the legs in the Wheatstone bridge;

the thermistors being arranged such that when the thermistors of the airflow sensor are located in a stream of air moving in a first direction, the thermistor of the first leg is at least partially shielded from airflow by the thermistor of the second leg, and when the stream of air is moving in a second direction opposite to the first direction, the thermistor of the second leg is at least partially shielded from airflow by the thermistor of the first leg, such that when the thermistors are exposed to air flow, the resistance value of the thermistor which is partially shielded from air flow is different from the thermistor which is not shielded from air flow, causing an imbalance between the legs of the Wheatstone bridge;

b) an amplifier having a differential input coupled to the junction points of the Wheatstone bridge, and an output having a signal proportional to a voltage difference between the junction points;

c) a microcontroller having an input coupled to the output of the amplifier and a plurality of outputs; and d) a plurality of lights coupled to plurality of outputs of the microcontroller;

such that the microcontroller illuminates the plurality of lights in a sequence simulating a moving light, the direction and speed of the moving light being proportional to the signal at the output of the amplifier;

the direction and speed of the moving light indicates a direction and speed of airflow of the stream of moving air.

46. A hinged door for a model building, comprising:

a) a panel of corrugated material comprising a first outer layer, a corrugated layer comprising a plurality of flutes, and a second outer layer, the panel comprising a door section and a mounting section separated by a living hinge formed by cutting through one of the first outer layer or the second outer layer along a flute, the door section and the mounting section being hingedly attached by the other of the first outer layer or the second outer layer which is not cut; and b) a control rod having a J-shape, wherein a short leg of the J fits into a first flute of the corrugated layer of the door section, and a long leg of the J fits into a second flute at the living hinge of the hinged door, such that the long leg of the J extends through the room layer and can be rotationally controlled from outside the room layer.

47. The hinged door of claim 46, further comprising a friction clutch coupled to the control rod, for frictionally restraining movement of the control rod to allow positioning the door in a range of positions from fully open to fully closed.

* * * * *